US011396121B2

(12) United States Patent
Ledvina et al.

(10) Patent No.: US 11,396,121 B2
(45) Date of Patent: Jul. 26, 2022

(54) EXTRUDED VARIEGATED PLASTIC PROFILE AND METHOD

(71) Applicant: N.E.W. PLASTICS CORP., Luxemburg, WI (US)

(72) Inventors: Louis Ledvina, Luxemburg, WI (US); Christopher J Michiels, Green Bay, WI (US); Marco A Maldonado, Ledgeview, WI (US); Luar G Perez, Green Bay, WI (US); Anthony S Phillips, Green Bay, WI (US)

(73) Assignee: N.E.W. Plastics Corp., Luxemburg, WI (US)

( * ) Notice: Subject to any disclaimer, the term of this patent is extended or adjusted under 35 U.S.C. 154(b) by 88 days.

(21) Appl. No.: 16/545,910

(22) Filed: Aug. 20, 2019

(65) Prior Publication Data

US 2020/0055225 A1 Feb. 20, 2020

Related U.S. Application Data

(60) Provisional application No. 62/765,281, filed on Aug. 20, 2018.

(51) Int. Cl.
*B29C 48/25* (2019.01)
*B44F 9/02* (2006.01)
*B29C 48/495* (2019.01)
*B29C 48/70* (2019.01)
*B29C 48/00* (2019.01)

(52) U.S. Cl.
CPC ............ *B29C 48/25* (2019.02); *B29C 48/022* (2019.02); *B44F 9/02* (2013.01); *B29C 48/0022* (2019.02); *B29C 48/495* (2019.02); *B29C 48/705* (2019.02)

(58) Field of Classification Search
CPC ... B29C 48/25; B29C 48/022; B29C 48/0022; B29C 48/2556; B29C 48/92; B29C 48/705; B29C 48/495; B44F 9/02
See application file for complete search history.

(56) References Cited

U.S. PATENT DOCUMENTS 2,696,640 A * 12/1954 Wienand ................. B29C 48/35
425/114
2,897,541 A *  8/1959 Camillo ................. B29C 48/313
425/197
3,720,572 A *  3/1973 Soda ..................... B29C 44/468
428/338

(Continued)

FOREIGN PATENT DOCUMENTS

CN          201325170         10/2009
DE            3904967          2/1990
(Continued)

*Primary Examiner* — Seyed Masoud Malekzadeh
(74) *Attorney, Agent, or Firm* — Ryan Kromholz & Manion, S.C.

(57) ABSTRACT

An apparatus and method for forming as extruded variegated plastic profile, including a multi-manifold slotted feed block assembly having a primary input manifold assembly, a secondary input manifold assembly, a flow distribution assembly in fluid communication with the primary input manifold assembly and the secondary input manifold assembly, a zone assembly having at least one restrictor and at least one mixer, and optionally, an extra line manifold assembly in communication with the flow distribution assembly.

2 Claims, 19 Drawing Sheets

(56) References Cited

U.S. PATENT DOCUMENTS

| | | | | |
|---|---|---|---|---|
| 3,874,981 | A * | 4/1975 | Hayashi | B29C 44/507 |
| | | | | 225/2 |
| 3,940,220 | A * | 2/1976 | D'Arcangeli | B29C 48/38 |
| | | | | 264/102 |
| 4,128,386 | A * | 12/1978 | Wissinger | B29C 48/92 |
| | | | | 425/382.4 |
| 4,336,012 | A * | 6/1982 | Koch | B29C 48/21 |
| | | | | 425/462 |
| 5,269,995 | A * | 12/1993 | Ramanathan | B29C 48/21 |
| | | | | 264/211 |
| 5,316,703 | A * | 5/1994 | Schrenk | B29C 48/16 |
| | | | | 264/1.6 |
| 5,389,324 | A * | 2/1995 | Lewis | B29C 48/92 |
| | | | | 264/1.6 |
| 5,474,722 | A * | 12/1995 | Woodhams | B29C 48/04 |
| | | | | 264/108 |
| 5,620,642 | A | 4/1997 | Kamite et al. | |
| 5,866,054 | A | 9/1999 | Dorchester et al. | |
| 6,153,293 | A | 11/2000 | Dahl et al. | |
| 6,284,810 | B1 * | 9/2001 | Burnham | B29C 44/3446 |
| | | | | 264/45.9 |
| 6,706,223 | B1 * | 3/2004 | Anderson | C08J 9/00 |
| | | | | 264/541 |
| 6,884,377 | B1 * | 4/2005 | Burnham | B29C 44/461 |
| | | | | 264/53 |
| 6,929,841 | B1 * | 8/2005 | Van Dijk | B29C 48/705 |
| | | | | 428/113 |
| 8,168,104 | B2 | 5/2012 | Han et al. | |
| 8,197,733 | B2 | 6/2012 | Sudano | |
| 8,382,464 | B2 * | 2/2013 | Keller | B29C 48/2556 |
| | | | | 425/197 |
| 8,697,221 | B2 | 4/2014 | Han et al. | |
| 9,162,406 | B2 * | 10/2015 | Neavin | B32B 27/08 |
| 9,750,268 | B1 * | 9/2017 | Thomas | B29C 48/05 |
| D819,234 | S | 5/2018 | Stephens et al. | |
| D819,235 | S | 5/2018 | Stephens et al. | |
| D819,236 | S | 5/2018 | Stephens et al. | |
| D827,869 | S | 9/2018 | Stephens et al. | |
| 2002/0167102 | A1 * | 11/2002 | Yamaguchi | B28B 3/2654 |
| | | | | 264/211.21 |
| 2007/0160807 | A1 | 7/2007 | Kraus | |
| 2013/0224437 | A1 | 8/2013 | Park et al. | |
| 2017/0282408 | A1 * | 10/2017 | Backmann | B29B 7/325 |
| 2018/0104847 | A1 | 4/2018 | Vanderminden | |

FOREIGN PATENT DOCUMENTS

| | | |
|---|---|---|
| JP | 02033511 | 7/1990 |
| JP | S58168529 | 7/1990 |
| JP | 03051212 | 8/1991 |
| JP | S62149425 | 8/1991 |
| JP | 10235706 | 9/1998 |
| WO | WO2017/175514 | 10/2017 |

* cited by examiner

EXTRUDED VARIEGATED PLASTIC PROFILE AND METHOD

RELATED APPLICATIONS

This application claims the benefit of U.S. Provisional Patent Application Ser. No. 62/765,281, entitled, "Extruded Variegated Plastic Profile and Method," and filed on 20 Aug. 2018.

BACKGROUND OF THE INVENTION

The present invention is directed to an apparatus and method for making an improved extruded variegated plastic profile. The profile may be for use as lumber, by way of non-limiting example. Known extruded plastic profile includes solid layered plastic film, solid layered sheet, solid layered pipe, and blown layered film. These products do not have a natural wood-like appearance and therefore are not usable in consumer applications in which a wood-like appearance is desirable. Therefore there is a need for an extruded plastic profile that includes the benefits of such material while also having a desirable wood-like appearance.

SUMMARY OF THE INVENTION

The present invention provides an extruded variegated plastic profile, method of manufacture, and apparatus in which the extruded variegated plastic profile maintains the relative texture, and density of a single extruded foam furniture grade plastic profile product. Moreover, the present invention provides a method for manufacturing a variegated plastic profile which has a lower overall density and specific gravity compared to that of known products, while further providing a fine textured, tight grain, wood-like surface appearance.

The method includes a controlled technique of melt introduction, temperature control, pressure, compression and decompression in a process of manufacture. The method further includes providing a predetermined amount of blowing agent. As will be discussed, each step plays a critical role in multiple aspects of the finished variegated plastic profile properties and characteristics.

The method of the present invention provides a high quality extruded variegated plastic profile that includes a furniture grade finish, strength, and variegated natural wood-looking appearance, unlike that of known methods. The present method combines multiple unique molten homogenous-foamed materials with a specific concentration of blowing agents in a multi-manifold slotted feed block, where each melt stream is distributed in a controlled manner while maintaining its individual imprint. The melt streams each continue through the flow distribution assembly to create a semi-laminar flowing single extrudate. The extrudate is passed through a surface control block which imparts a pattern on the extrudate surfaces, then through a compression/decompression zone assembly where it is compressed and decompressed to maintain its desired uniform fine cell structure.

The concentration of the blowing agent in combination with the temperature and pressure is critical as it reduces the density of the finished extruded variegated plastic profile and contributes to the stability of the desired level of semi-laminar flow. Lastly, the concentration of the blowing agent also affects the blending at the surfaces between the various melt streams, giving the product its unique variegated surface coloring effect.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be charged without departing from the invention, which is defined by the claims.

Figure 47A:
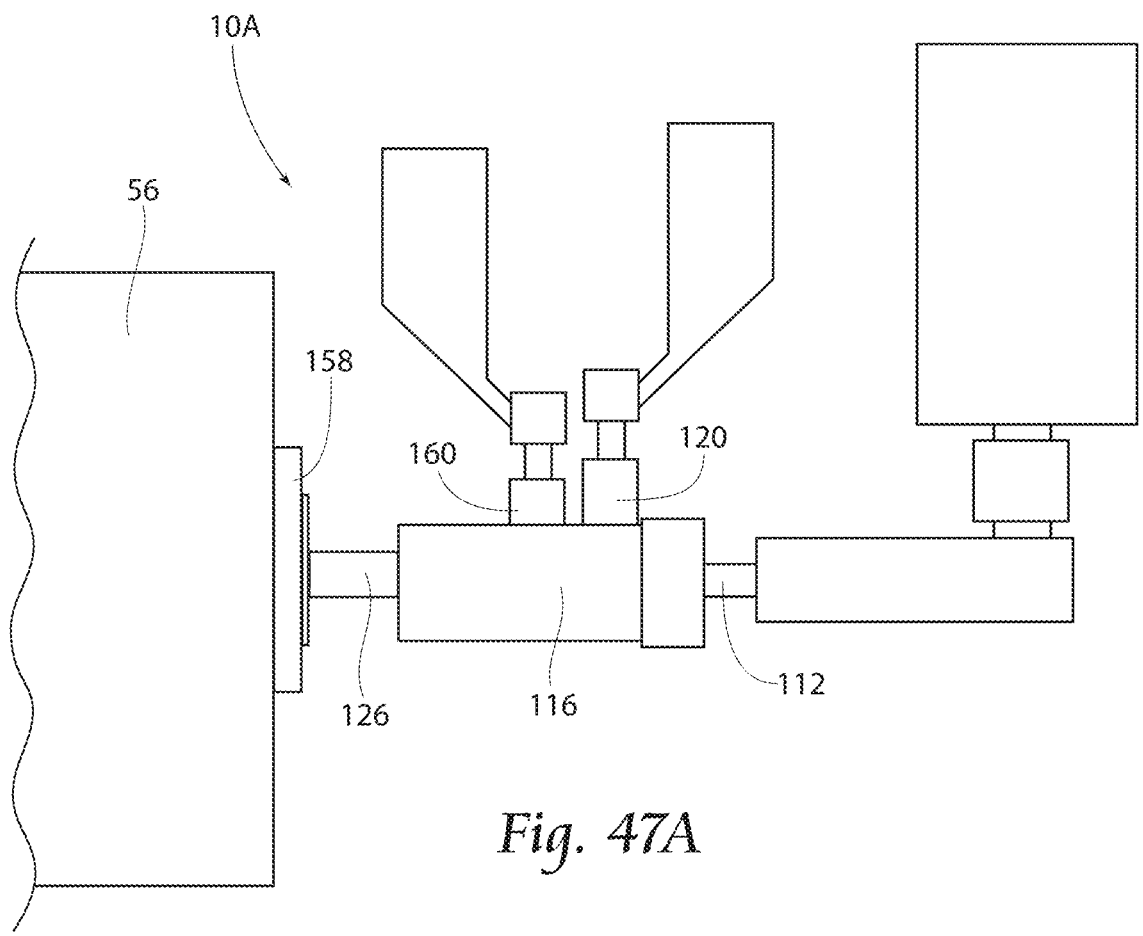
FIG. 47A is a diagrammatic representation of the system illustrated in FIGS. 22, 23, and showing extruded variegated plastic profile.
Figure 47B:
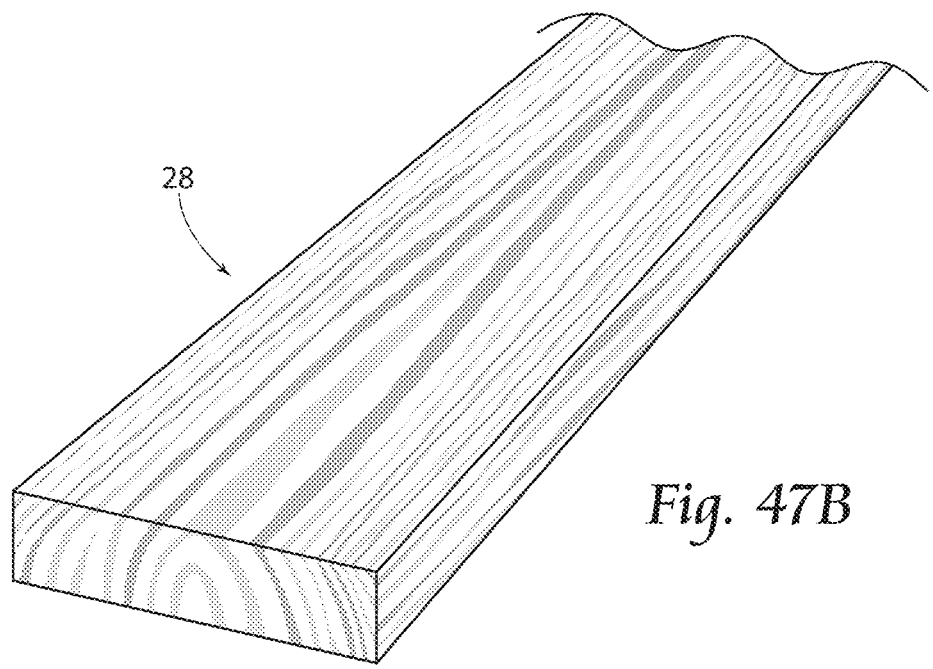
FIG. 47B is a perspective view of the extruded variegated plastic profile shown in FIG. 47A.

With attention to the Figures and particularly to FIGS. 1-5 and 19, a multi-manifold feed block assembly 10 for use with the present method may be seen. As shown, the assembly 10 includes an infeed manifold assembly 12 having a primary input 11 and a secondary input 20. A primary material melt stream 14 (see FIG. 19) enters the infeed manifold assembly 12 at the primary input 11, exits at the primary output 13, and is evenly distributed to the flow distribution assembly 16. A secondary, accent material melt stream 18 enters the secondary input 20 of the infeed manifold assembly 12, exits at the secondary output 21, and is evenly distributed to the flow distribution assembly 16 with the primary material 14. Distribution within the flow distribution assembly 16 will be discussed below. Moreover, once the distributed melt stream 22 (see FIG. 19) has been distributed in the flow distribution assembly 16, and as will be discussed in further detail, it moves through the surface control block 24, and compression/decompression zone assembly 26 prior to exiting as an extruded profile 28 (see FIGS. 47A, 47B). It is to be understood that the melt streams 14, 18 discussed herein may be comprised of any suitable plastic material for use in the manufacture of extruded variegated plastic profile, and typically including a colorant and a blowing agent (not shown).

Figure 19:
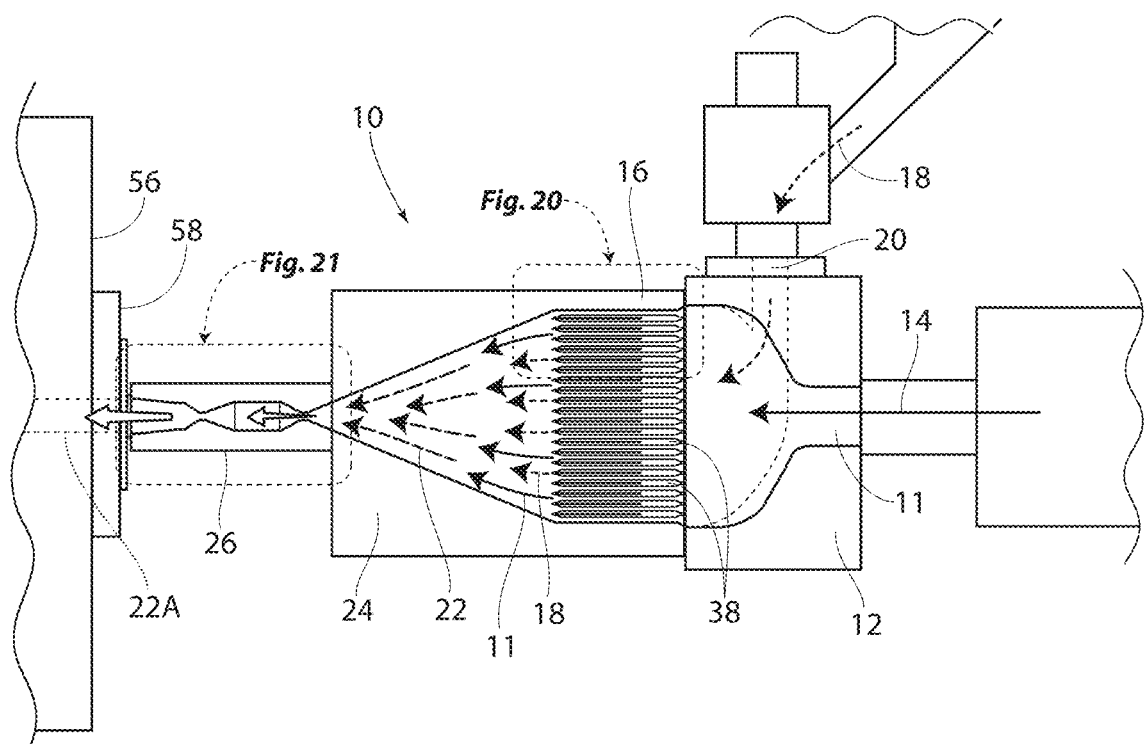
FIG. 19 is a diagrammatic representation of the system shown in FIGS. 1, 2, and 18, and showing flow of primary and secondary materials.
Figure 20:
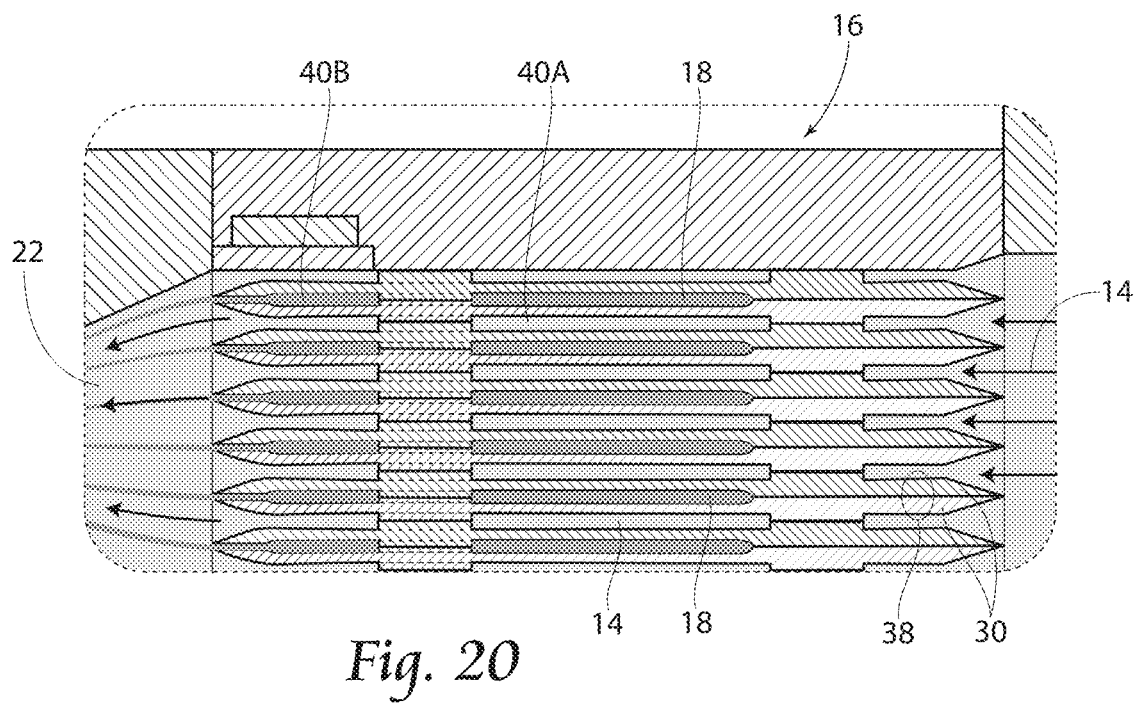
FIG. 20 is an enlarged fragmentary view of the area noted as FIG. 20 in FIG. 19, and showing flow of material at flow plates in the back-to-back configuration.
Figure 21:
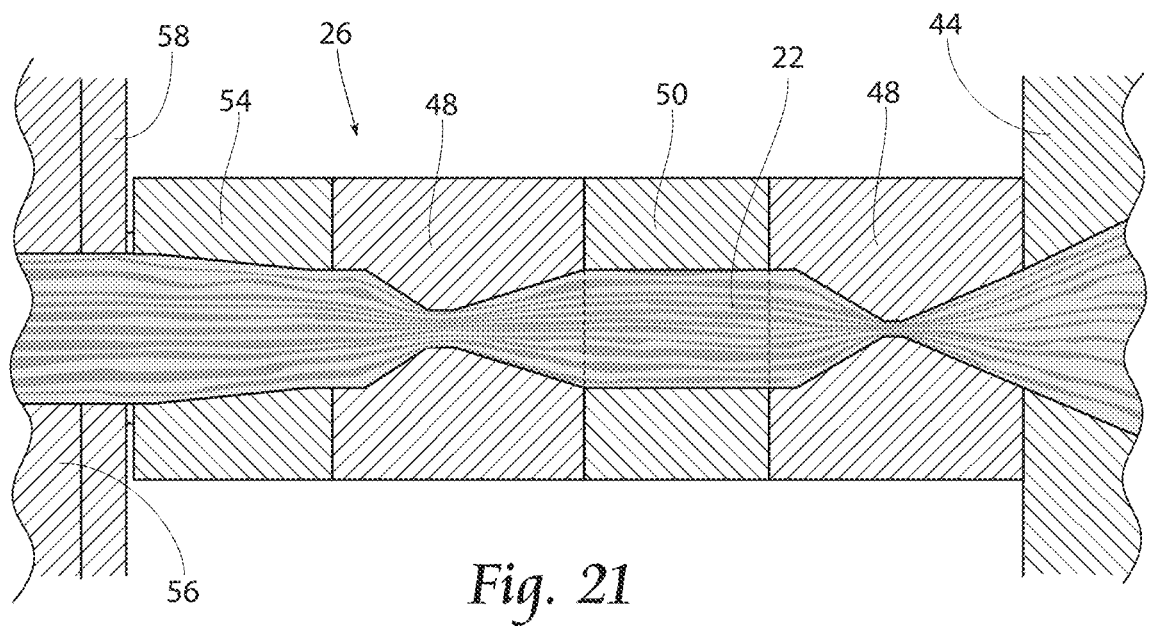
FIG. 21 is an enlarged fragmentary view of the area noted as FIG. 21 in FIG. 19, and showing flow of material at the compression/decompression zones.
Figure 22:
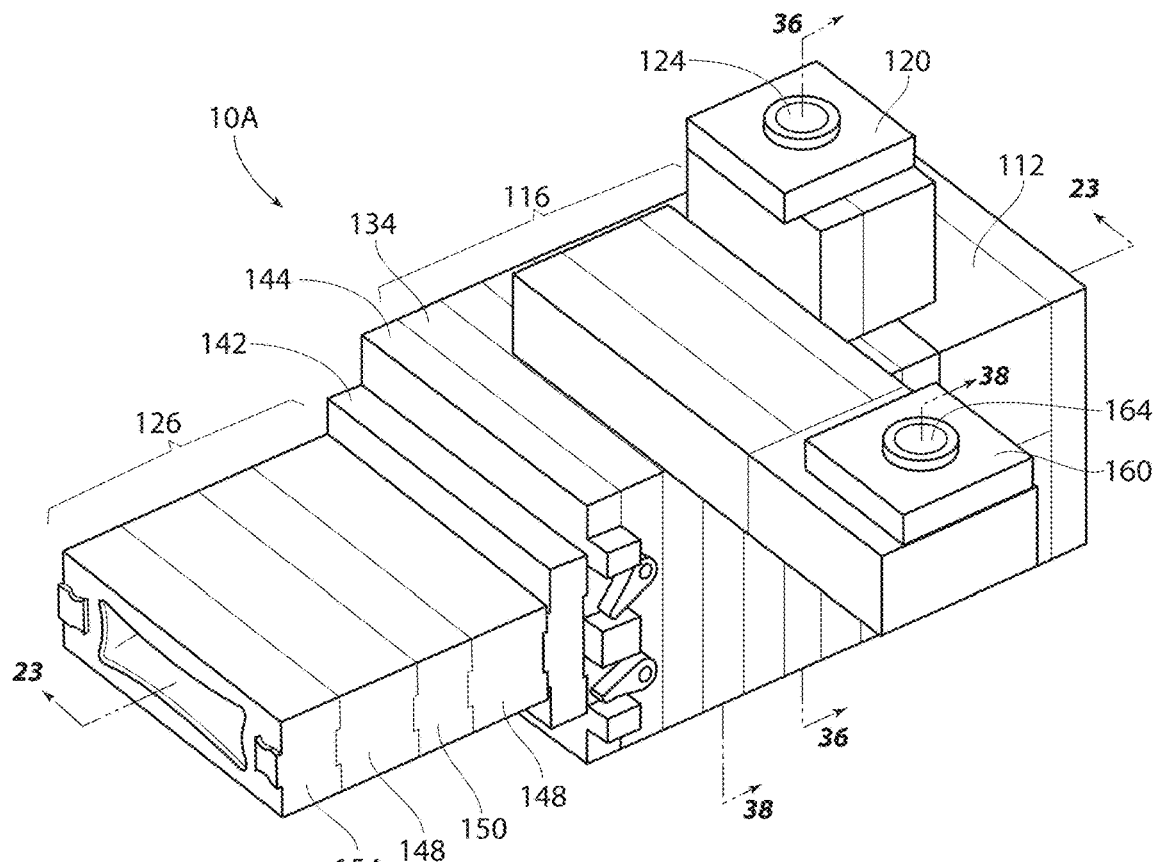
FIG. 22 is a per view of a manifold slotted feed block assembly for use with the present invention, similar to that of FIG. 1, but showing another line manifold.

With particular attention to FIGS. 2-12, the flow distribution assembly 16 may be seen. As shown, the flow distribution assembly 16 includes flow plates 30 which may be arranged in back-to-back, mirrored arrays 38 (see FIGS. 10E, 11), and a surface control assembly 42 having at least one adjustment fin 41. As seen in FIG. 10C, the top 32 of each flow plate 30 may include a profile having an upstanding structure 34 which provides disruption to the melt stream 22. Likewise, the bottom 36 of each flow plate 30 may include a profile having an upstanding structure 34 for similar purpose (see FIG. 10D). When a pair of flow plates 30 is arranged in a back-to-back, mirrored array, the respective profiles provide channels 40 for flow of the melt stream 22 (see also FIG. 20). As illustrated in FIGS. 19 and 20, the primary melt stream 14 is split into multiple melt streams after it exits the infeed manifold assembly 12 at primary output 13 and as it enters the plate arrays 38 within the flow distribution assembly 16. Likewise, the accent material melt stream 18 is also split into multiple melt streams after it exits the infeed manifold assembly 12 at the secondary output 21 and enters the plate arrays 38 within the flow distribution assembly 16.

As is shown particularly in FIGS. 9A-10D, each plate 30 within the flow distribution assembly 16 includes a top surface 32 and a bottom surface 36. As seen, the surfaces 32, 36 each include a profile arranged to divert the melts streams 14, 18 as they enter the respective input 11, 20. For example, after the secondary accent material stream 18 is split, each secondary melt stream 18 is further diverted in each plate array 38 it enters, to cover the entire cross section equal to that, of the primary material melt stream 14 in the plate arrays 38. As mentioned, the plates 30 are preferably positioned in in back-to back, mirror arrays 38, such that surface 32, 36, profiles form flow channels 40A, 40B. The primary material melt stream 14 flows from the primary output 13 through flow channel 40A, while the secondary material 18 flows from the secondary output 21 through flow channel 40B. Flow channel 40A, 40B depths are used to control the individual flow plate 30 thicknesses. More specifically the appearance of color blending of the final profile 23 surface is critically controlled in the flow distribution assembly 16. Even distribution of material in the melt streams 14, 18 is an imperative aspect of the process, to fill the entirety of each flow plate array 38. The importance of this step is significant and contrasts with prior art methods in which multi-manifold feedblocks are used, and the material is added in a single inlet port. In those processes the material continues as a single melt stream. In contrast, the method of the present invention ultimately splits the primary and accent material melt streams 14, 18 to thereby create variegation of the finished extruded profile 28.

Figure 14A:
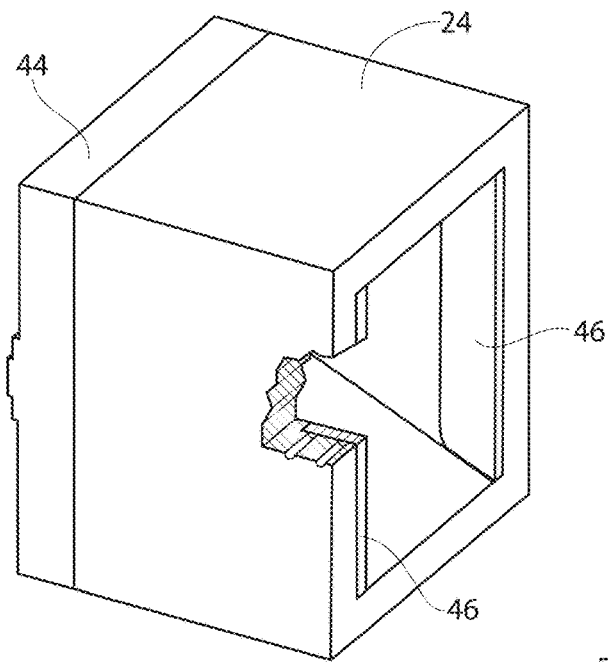
FIG. 14A is a perspective view with partial cutaway of the surface control block illustrated in FIGS. 1 and 2, and showing a side adjustment fin.
Figure 14B:
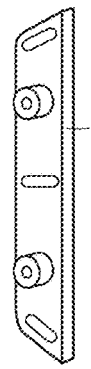
FIG. 14B is a perspective view of the side adjustment fin illustrated in FIG. 14A.
Figure 15:
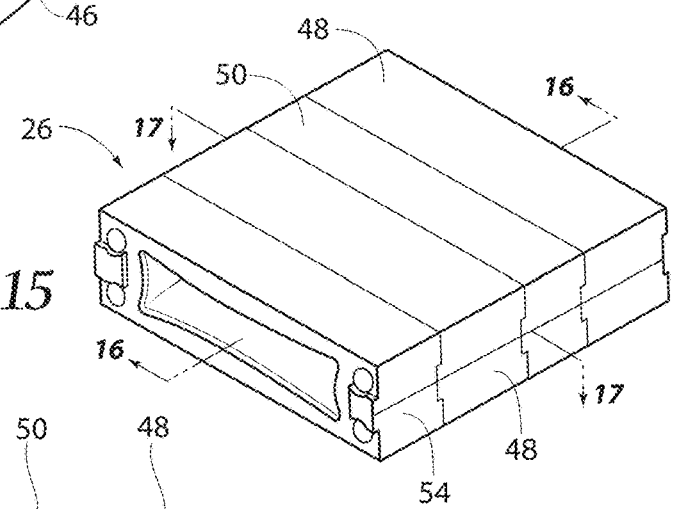
FIG. 15 is a perspective view of the compression/decompression zone assembly illustrated in FIGS. 1 and 2.
Figure 16:
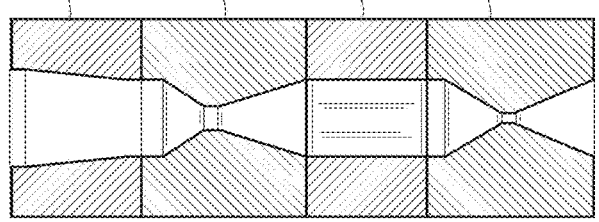
FIG. 16 is a sectional view of the compression/decompression zone assembly illustrated in FIG. 15 and taken along line 16-16 thereof.
Figure 17:
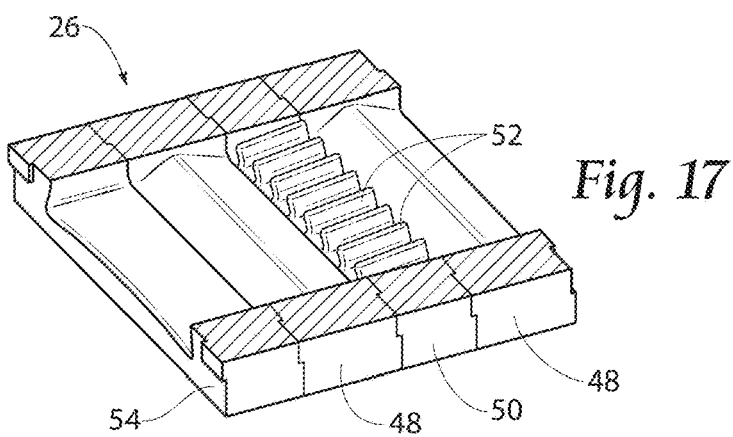
FIG. 17 is a sectional view of the compression/decompression zone assembly illustrated in FIG. 15 and taken along line 17-17 thereof.
Figure 18:
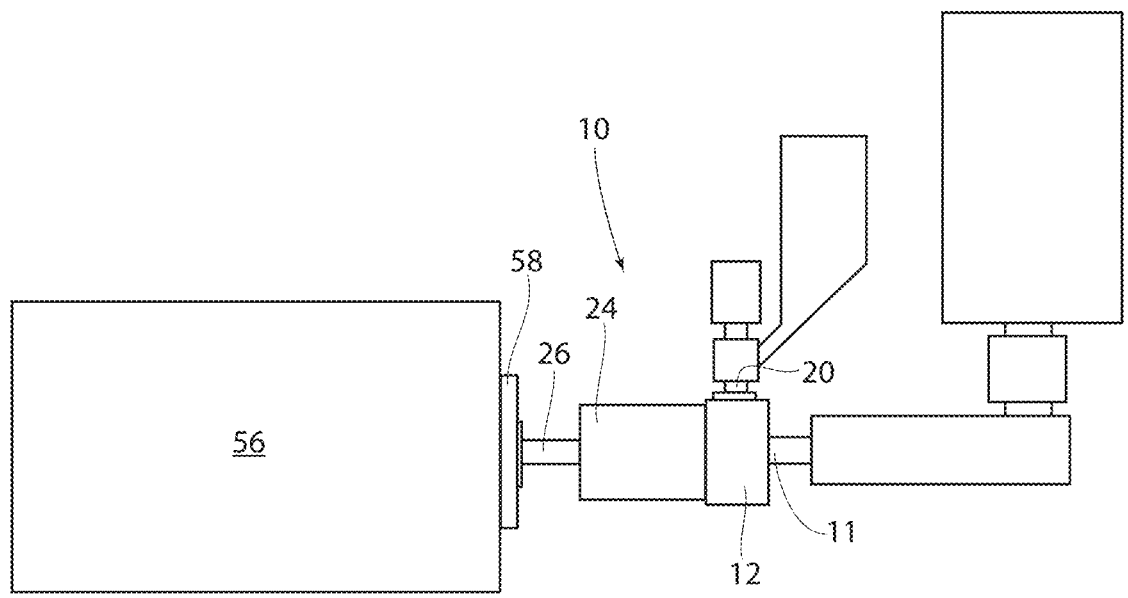
FIG. 18 is a diagrammatic representation of the manifold slotted feed block system illustrated in FIG. 1.

With attention to FIGS. 3-5, 14A, 19 and 20, it may be seen that the series of segmented material streams 14, 18 exits evenly from the flow distribution assembly 16, and unites as a melt stream 22 as it flows toward the surface control block 24. The surface control block 24 may preferably include at least side adjustment fin 46 (see FIG. 14B). Flow of the melt stream 22 through the surface control block 24, side adjustment fins 46, and transition plate 44, in combination with an effective amount of chemical blow agent (up to 3% by weight), delivers a smooth melded appearance to the profile 28 surface as the multiple melt streams unite.

Figure 1:
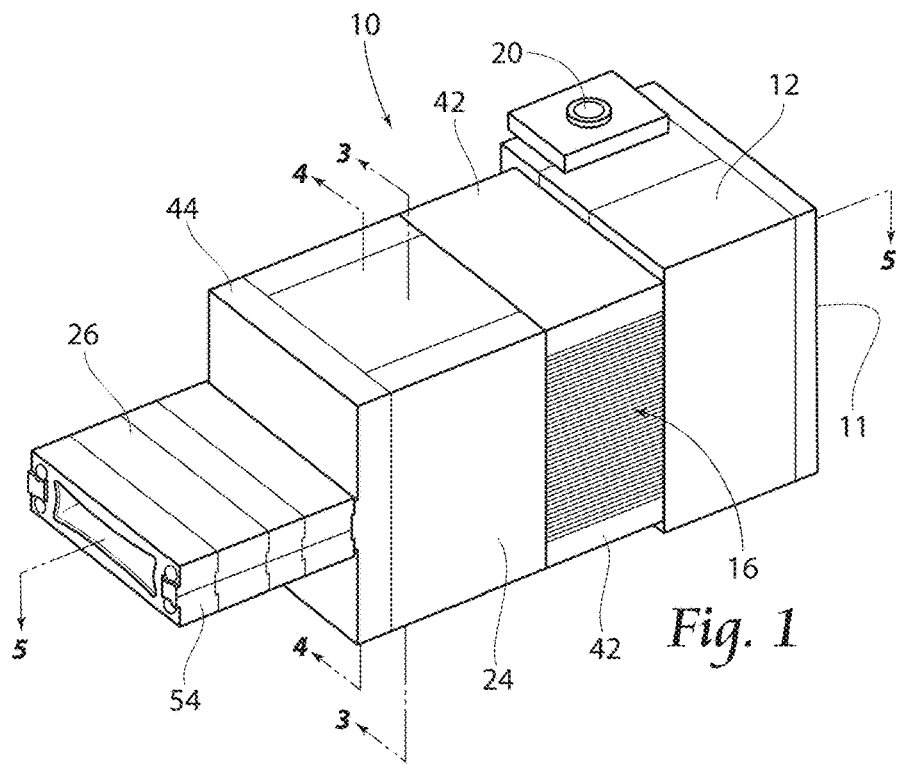
FIG. 1 is a perspective view of a manifold slotted feed block assembly for use with the present invention and showing an infeed manifold assembly, flow distribution assembly, surface control block, transition plate, and compression/decompression zone assembly.
Figure 2:
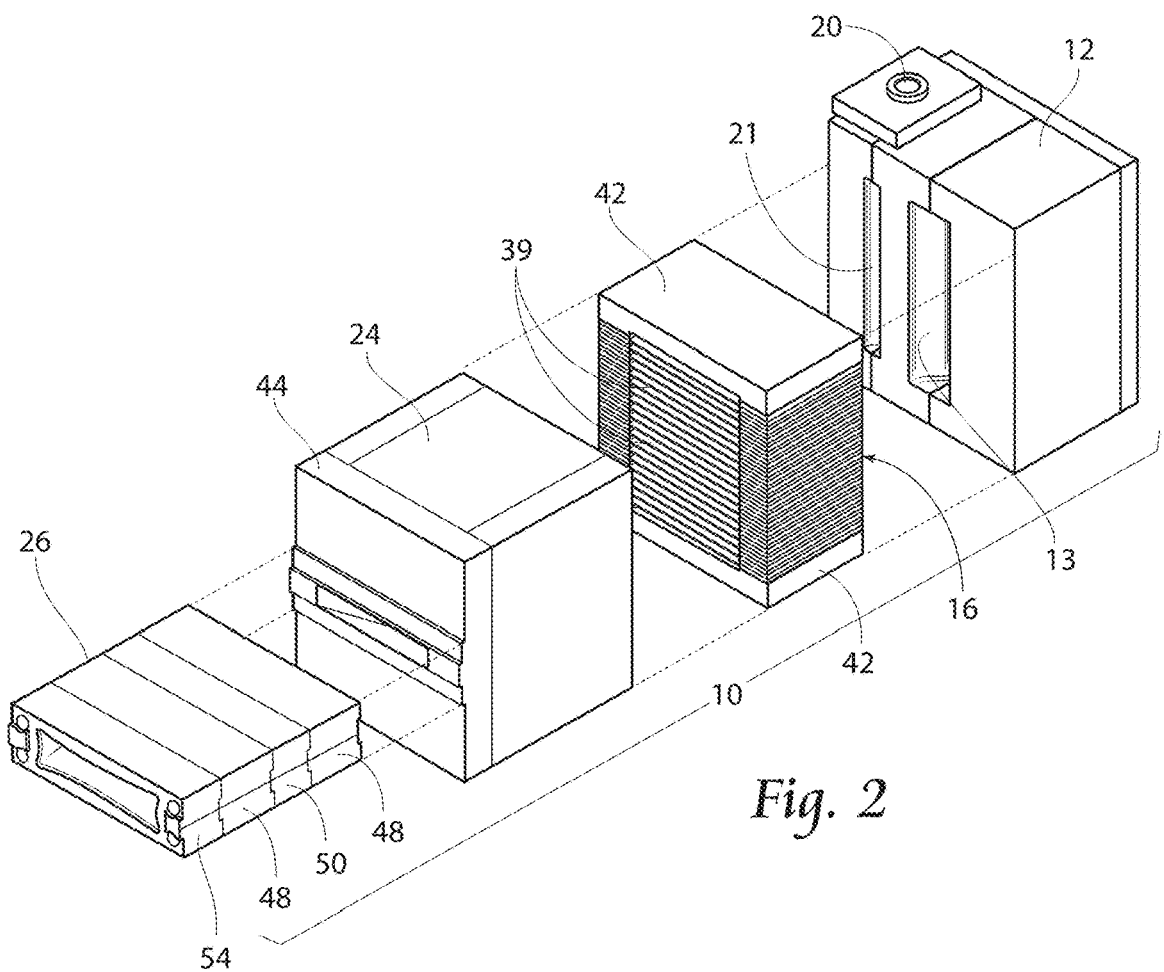
FIG. 2 is a partially exploded view of the assembly shown in FIG. 1.
Figure 3:
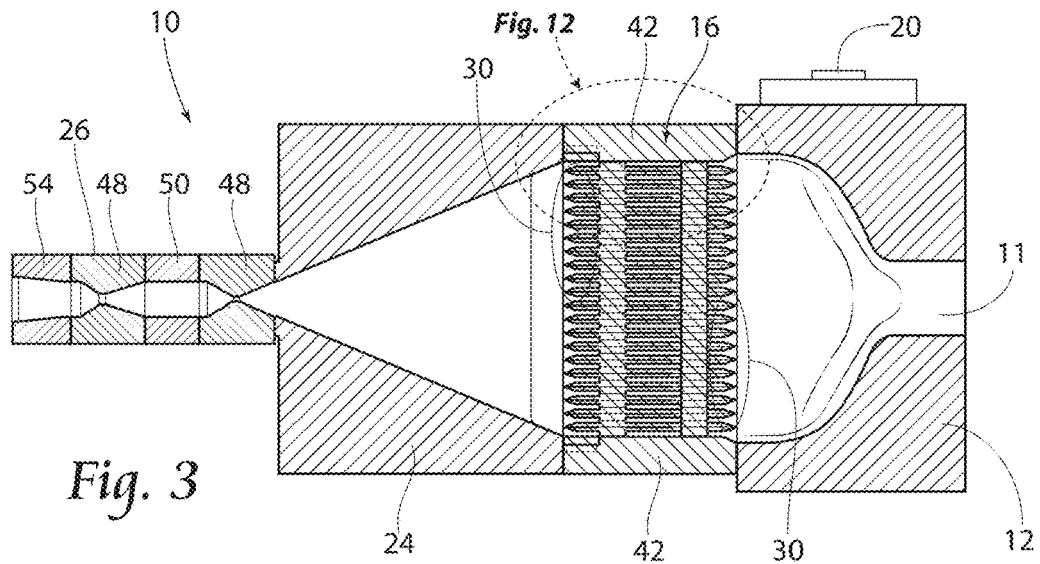
FIG. 3 is a section view of the assembly shown in FIG. 1, and taken along lines 3-3 thereof.
Figure 4:
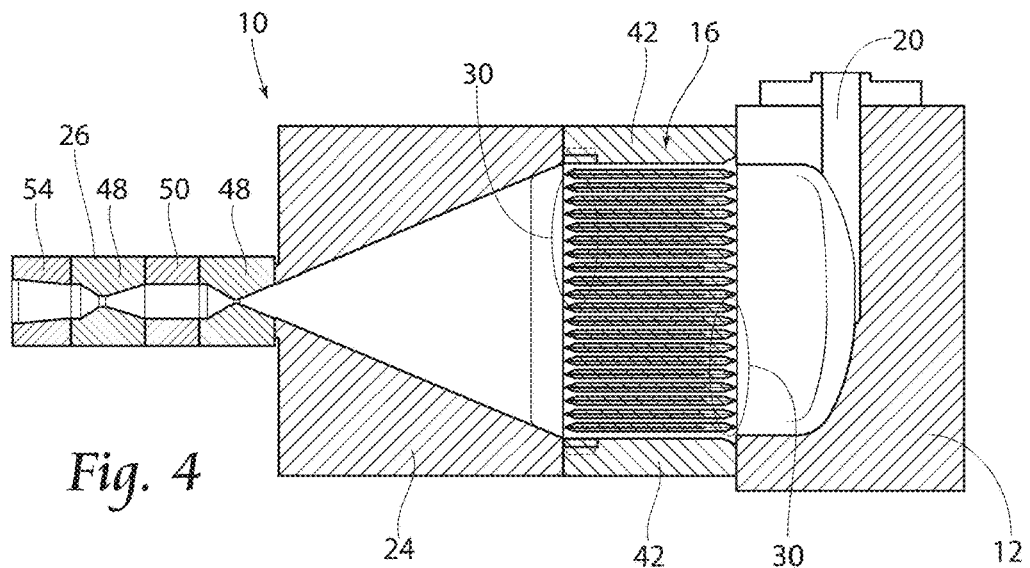
FIG. 4 is a section view of the assembly shown in FIG. 1, and taken along lines 4-4 thereof.
Figure 5:
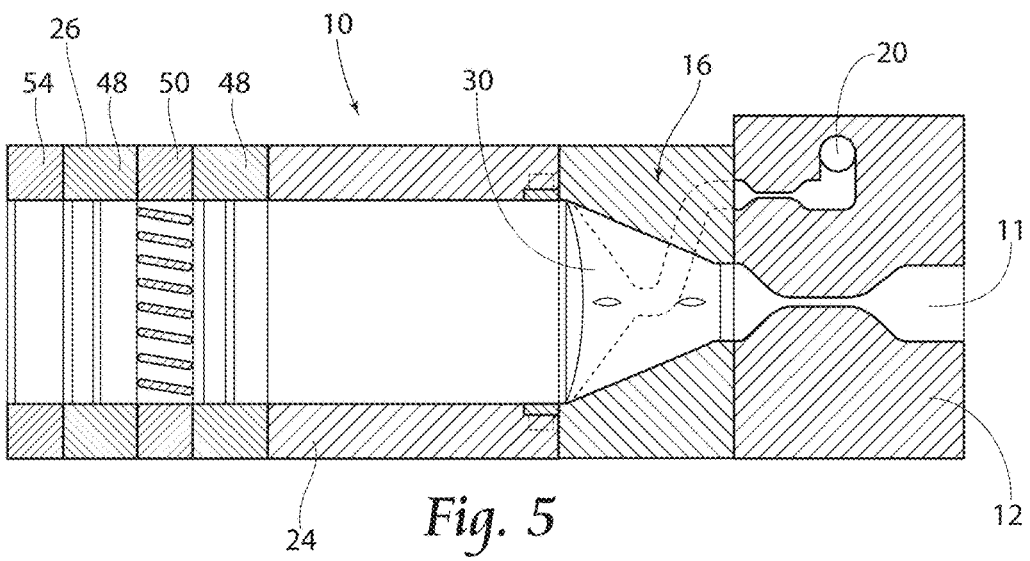
FIG. 5 is a section view of the assembly shown in FIG. 1, and taken along lines 5-5 thereof.
Figure 6:
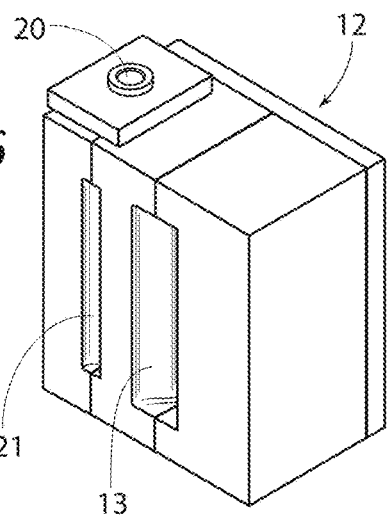
FIG. 6 is a perspective view of the infeed manifold assembly illustrated in FIG. 1.
Figure 7:
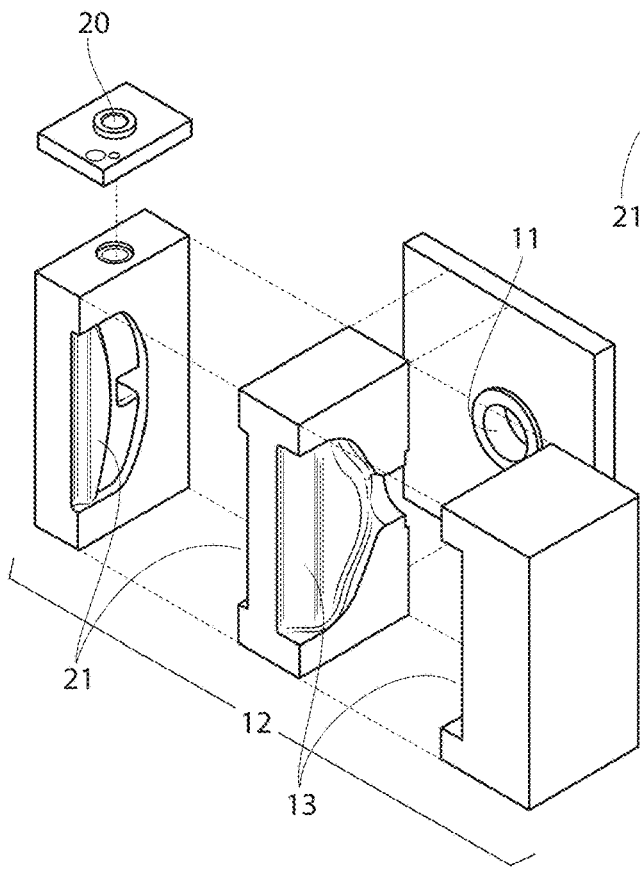
FIG. 7 in an exploded view of the infeed manifold assembly illustrated in FIG. 6.
Figure 8:
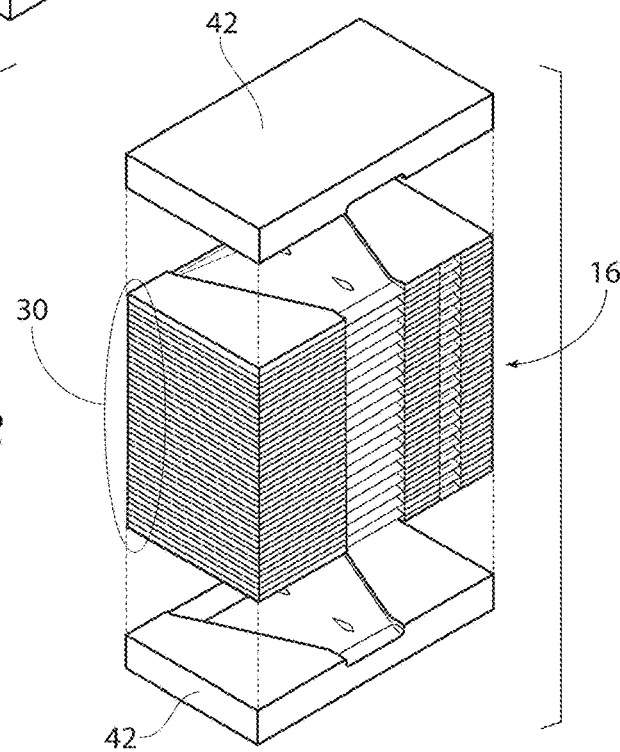
FIG. 8 is a partially exploded view of the flow distribution assembly illustrated in FIG. 1.
Figure 9A:
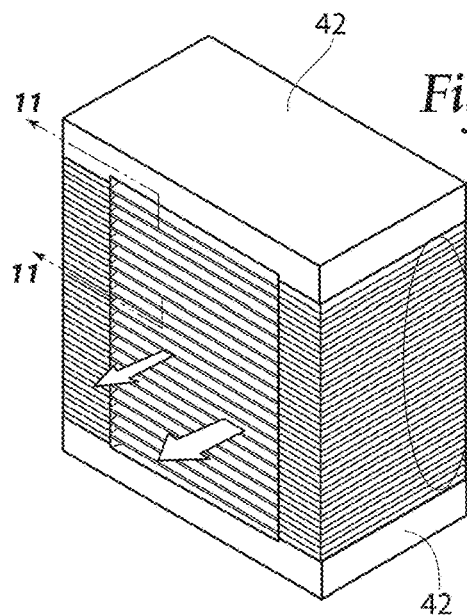
FIG. 9A is an assembled front perspective view of the flow distribution assembly shown in FIGS. 1 and 8.
Figure 9B:
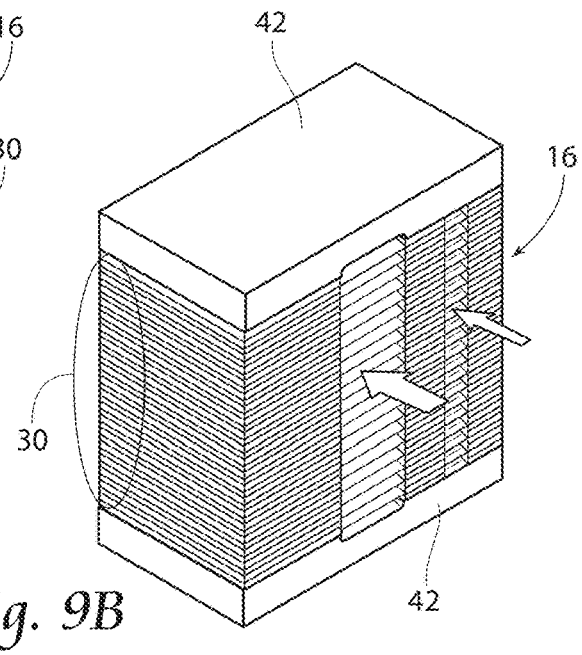
FIG. 9B is an assembled rear perspective view of the flow distribution assembly shown in FIGS. 1, 8, and 9A.
Figure 10A:
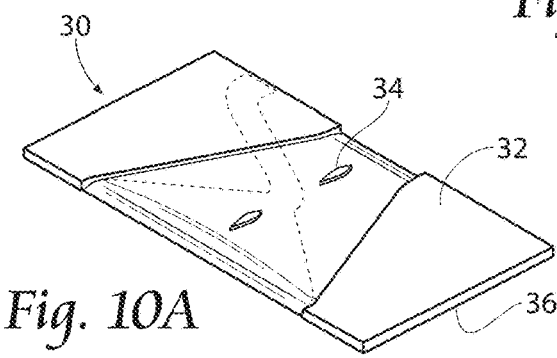
FIG. 10A is a front perspective view of a flow plate for use in the flow distribution assembly shown in FIGS. 1, 8, 9A and 9B.
Figure 10B:
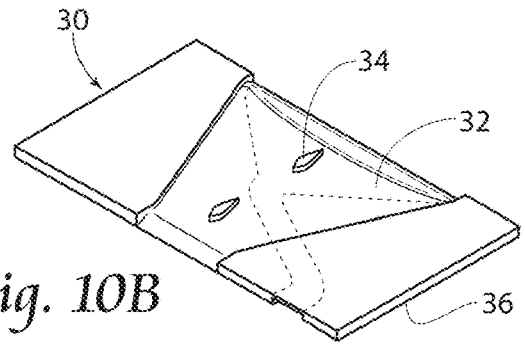
FIG. 10B is a rear perspective view of the flow plate shown in FIG. 10A and for use in the flow distribution assembly shown in FIGS. 1, 8, 9A and 9B.
Figure 10C:
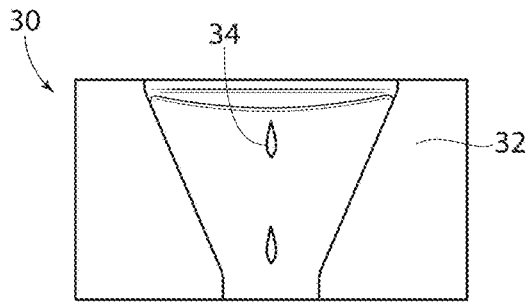
FIG. 10C is a top plan view of the flow plate shown in FIGS. 10A, 10B and for use in the flow distribution assembly shown in FIGS. 1, 8, 9A and 9B.
Figure 10D:
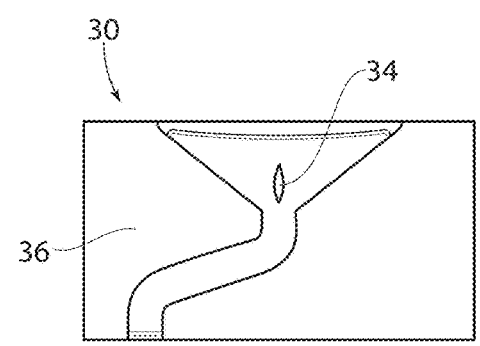
FIG. 10D is a bottom plan view of the flow plate shown in FIGS. 10A, 10B, 10C, and for use in the flow distribution assembly shown in FIGS. 1, 8, 9A and 9B.
Figure 10E:
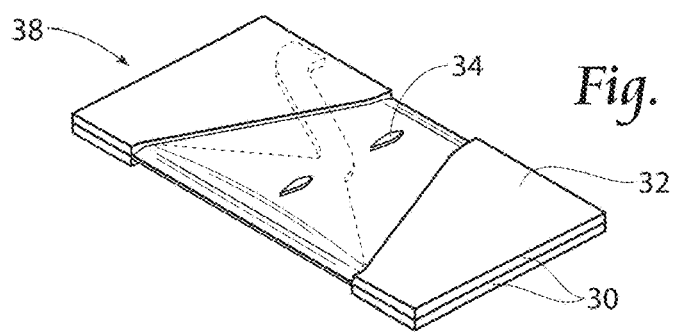
FIG. 10E is a view similar to that of FIG. 10A, but showing two flow plates in a back-to-back configuration, the plates being mirror images of one another.
Figure 11:
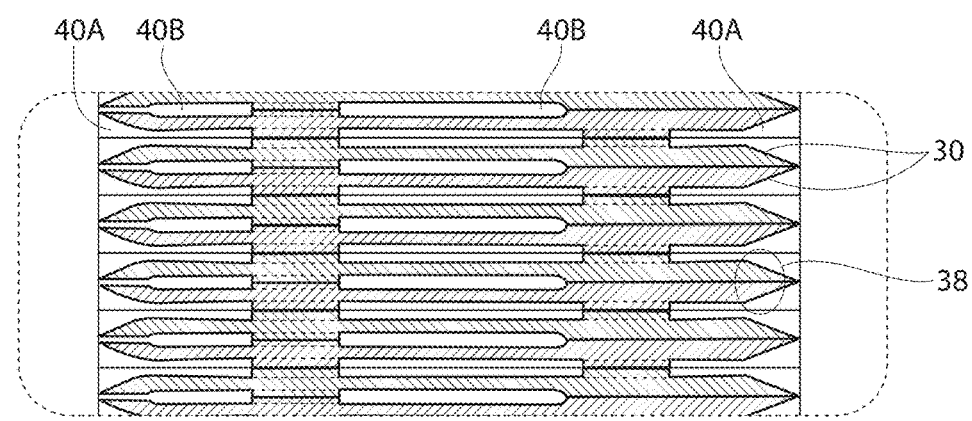
FIG. 11 is a sectional view of the flow distribution assembly illustrated in FIG. 9A, taken along line 11-11 thereof, and showing stacks of flow plates in the back-to-back configuration shown in FIG. 10E.
Figure 12:
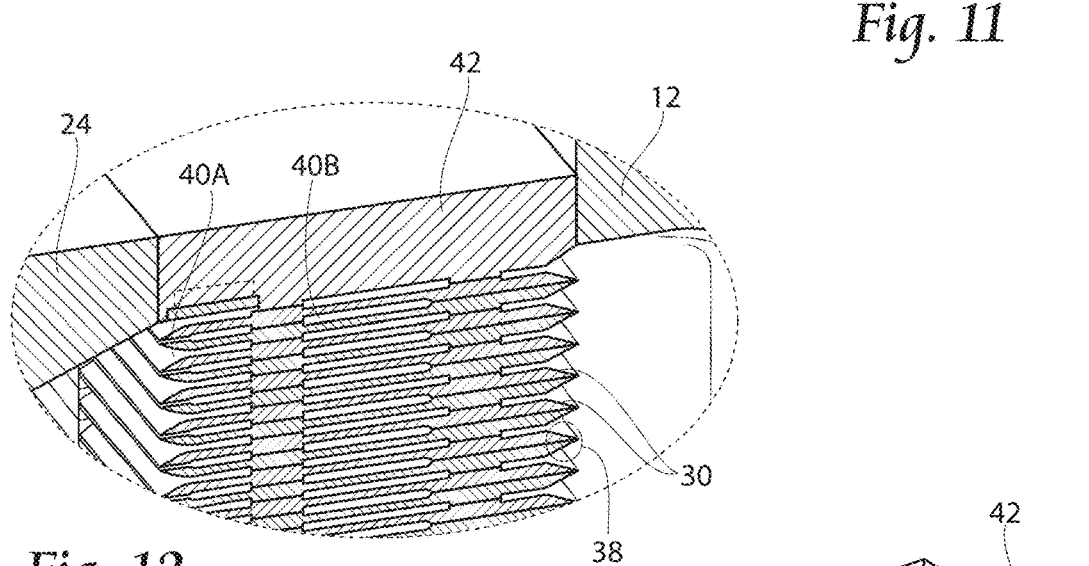
FIG. 12 is an enlarged fragmentary view of the area noted as FIG. 12 in FIG. 3, and showing a portion of the surface control assembly and adjustment fin.
Figure 13:
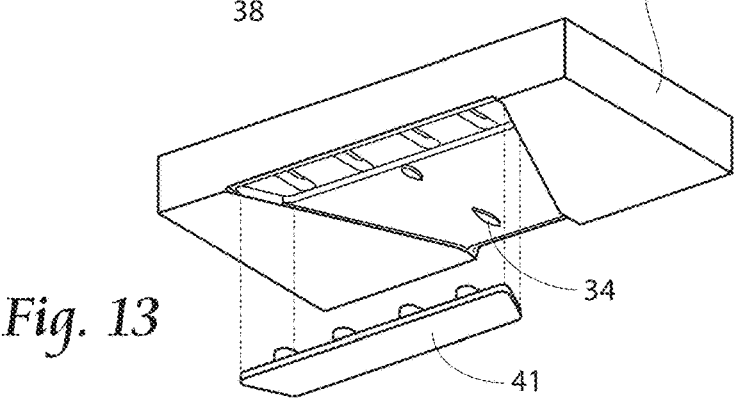
FIG. 13 is an exploded view of surface control assembly illustrated in FIG. 8, and showing an adjustment fin.

As seen in FIGS. 15-19 and 21, the melt stream 22 exits the surface control block 24 through the transition plate 44 and moves into the compression/decompression zone, assembly 26 (see also FIG. 2). As may be viewed particularly in FIGS. 16 and 17, the compression/decompression zone assembly 26 preferably includes a series zones, including restrictors 48 and mixers 50, wherein the mixers 50 may include upstanding ridges 52 or other interrupters to provide turbulence and blending of the melt stream 22 and to supply the profile 28 surface with striations and other desired characteristics. The melt stream 22 is further combined and compressed together in the compression/decompression zone assembly 26 by use of temperature control and pressure control, in combination with the various other described areas of the process. Use of the flow distribution assembly 16 in conjunction with the compression/decompression zone assembly 26 is critical to maintain stability of the material. Further, the degree of laminar flow as a semi-laminar flow appearance created by the present invention, imparts the end product (extruded variegated plastic profile 28) with a highly desired natural, wood-like appearance, which is critically impacted by the degree of temperature exposure, effective chemical blowing agent amount, and series of pressure turbulences. The unique combination of turbulence, created by compressing, decompressing, recompressing, temperature, pressure created by the chemical blowing agent and pressure drop across the multi-manifold slotted feed block assembly 10, all contribute to produce the desired swirling natural wood-like cross sectional appearance of the finished extruded variegated plastic profile 28. It is preferred that melt temperature be controlled between 300-400 degrees Fahrenheit across the assembly 10. Moreover, it is preferred that pressure across the assembly is to be controlled between 500-2000 psi. Furthermore, the preferred degree of pressure drop, less than 2000 psi, created as the material moves from the flow distribution assembly 16, through the surface control block 24, transition plate 44, and slow taper extrusion plate 54 of the compression/decompression zone assembly 26, in combination with the effective amount of chemical blowing (not shown) agent create a superior, uniform, fine cell structure in the finished profile 28. It is to be understood that the blowing agent ingredient used with the assembly 10 and method may be any blowing agent known in the industry with an effective amount in the range of 0.5-4.0 percent by weight used in the method.

With attention to FIG. 19, the melt stream 22 may be seen as an extrudate 22A. The extrudate 22A will expand upon exiting the compression/decompression zone assembly 26 and slow taper extrusion plate 54. Upon exposure to the atmosphere, gas is exhausted from the chemical blowing agent and escapes the extrudate 22A. The extrudate 22A continues to expand sufficiently to fill the calibrating sleeve 58, where the combination of expansion, gas expulsion, and distance between the compression/decompression zone assembly 26 and calibrating sleeve 58 create a unique fine grain, matte, and tight furniture grade surface on the finished profile 28. As the extrudate 22A passes through the slow taper extrusion plate 54 and calibrating sleeve 58, the extrudate 22A is sized into its final molded shape prior to it entering the cooling tank 56. The profile 28 continues to cool by conventional means and a cutoff saw (not shown) cuts the profile 28 to the desired lengths.

With attention now to FIGS. 22-51 another a multi-manifold feed block assembly 10A for use with the present method may be seen. As shown, the assembly 10A includes a primary input manifold assembly 112 having a primary input 111. A primary melt stream 114 (see FIG. 48) enters the primary input manifold assembly 112 at the primary input 111, exits at the primary output 113, and is evenly distributed to the flow distribution assembly 116. A secondary color input manifold assembly 129 for introductions of a secondary melt stream 113, and an extra line manifold assembly 160 for introduction of a third melt stream 162 will also be discussed. As shown, the multi-manifold feed block assembly 10A may further include a transition plate 144, a connector plate 142, and a compression/decompression zone assembly 126. Distribution of the flow streams 114, 118, 162 within the flow distribution assembly 116 will be discussed below. Moreover, once the distributed melt stream 122 (see FIG. 48) has been distributed in the flow distribution assembly 116, and as will be discussed in further detail, it moves through the transition plate 144, connector plate 142 and compression/decompression zone assembly 126 prior to exiting as an extruded profile 28 (see FIG. 47B).

Similar to that of the previous embodiment, and as seen in FIGS. 23-27, the primary input manifold 112 is arranged for entry of a primary material melt stream 114 into the flow distribution assembly 116. A primary material melt stream 114 enters the primary input manifold 112 at the primary input 111, exits at the primary output 113 and is evenly distributed in the flow distribution assembly 116. A secondary input manifold 120 (see FIGS. 35, 36) is arranged for input of a secondary, accent material melt stream 118. A secondary, accent material melt stream 118 enters the secondary input manifold assembly 120 at secondary input 124 and exits at secondary output 121, where the accent secondary material 118 is evenly distributed in the flow distribution assembly 116 with the primary material 114. In the embodiment shown in these views, an extra line manifold assembly 160 is further provided (see particularly FIGS. 37, 38), wherein another, third material stream 162 may be introduced. As shown, a third material melt stream 162 enters the extra line manifold 160 at a third input 164 and exits at a third output 166, where the third material stream 162 is evenly distributed in the flow distribution assembly 116 with the primary and secondary material 114, 118. The primary material melt stream 114, secondary material melt stream 118, and extra line material melt stream 162 combine and move through the flow distribution assembly 116 and exit as a blended, distributed melt stream 122. As mentioned and to be discussed, the distributed melt stream 122, exits the flow distribution assembly 116, moves through the transition plate 144, connector plate 142 and compression/decompression zone assembly 126 prior to exiting as an extruded profile 28 (see FIG. 47B).

With particular attention to FIGS. 23 and 28-38, the flow distribution assembly 116 for use with the assembly 10A may be seen. As shown, the flow distribution assembly 116 includes a series of line block assemblies 170. Each line block assembly 170 includes at least a line block entrance 172 and a line block exit 174.

Figure 23:
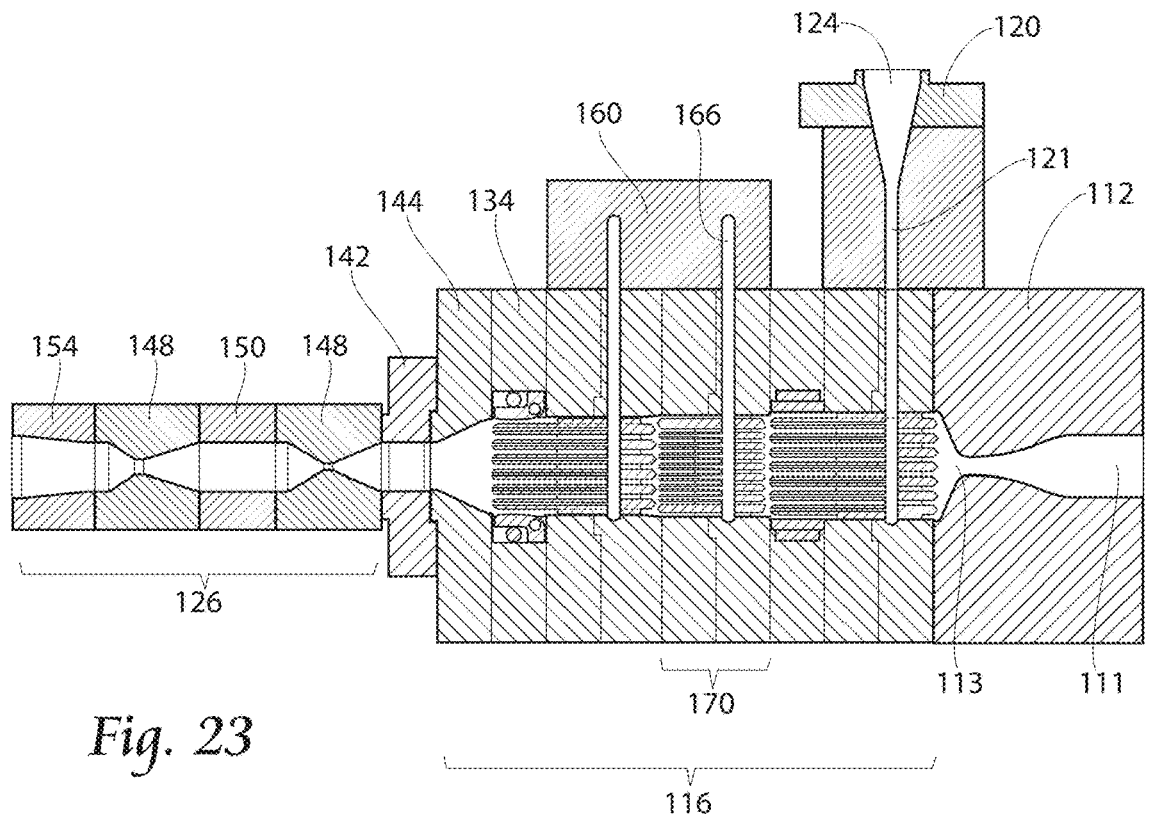
FIG. 23 is a sectional view of the assembly illustrated in FIG. 22 and taken along line 23-23 thereof.
Figure 24:
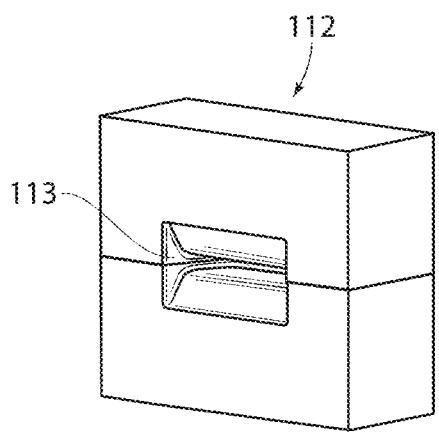
FIG. 24 is a perspective view of the primary input manifold illustrated in FIGS. 22, 23.
Figure 25:
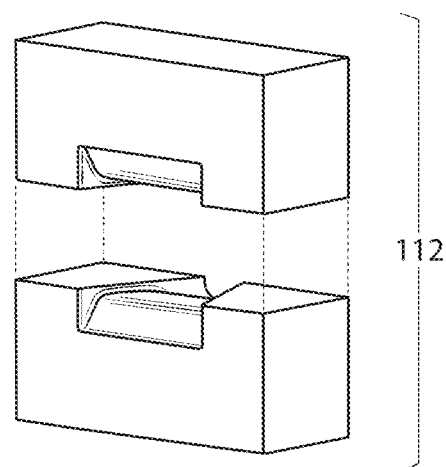
FIG. 25 is an exploded view of the primary input manifold illustrated in FIG. 24.
Figure 26:
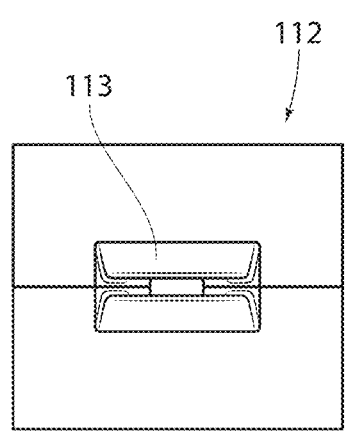
FIG. 26 is a front view of the primary input manifold illustrated in FIGS. 24, 25.
Figure 27:
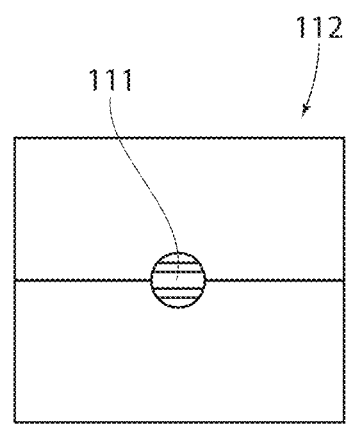
FIG. 27 is a rear view of the primary input manifold illustrated in FIGS. 24, 25, 26.
Figure 28:
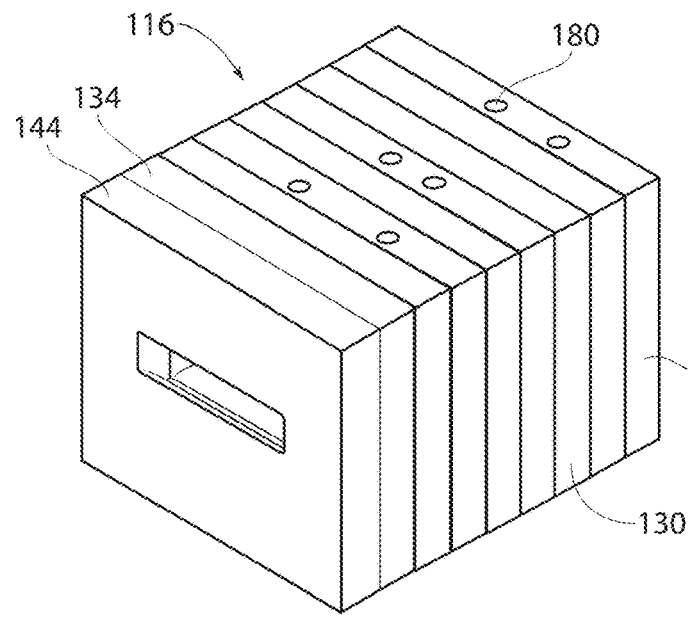
FIG. 28 is a perspective view of the flow distribution assembly illustrated in FIGS. 22, 23.
Figure 29:
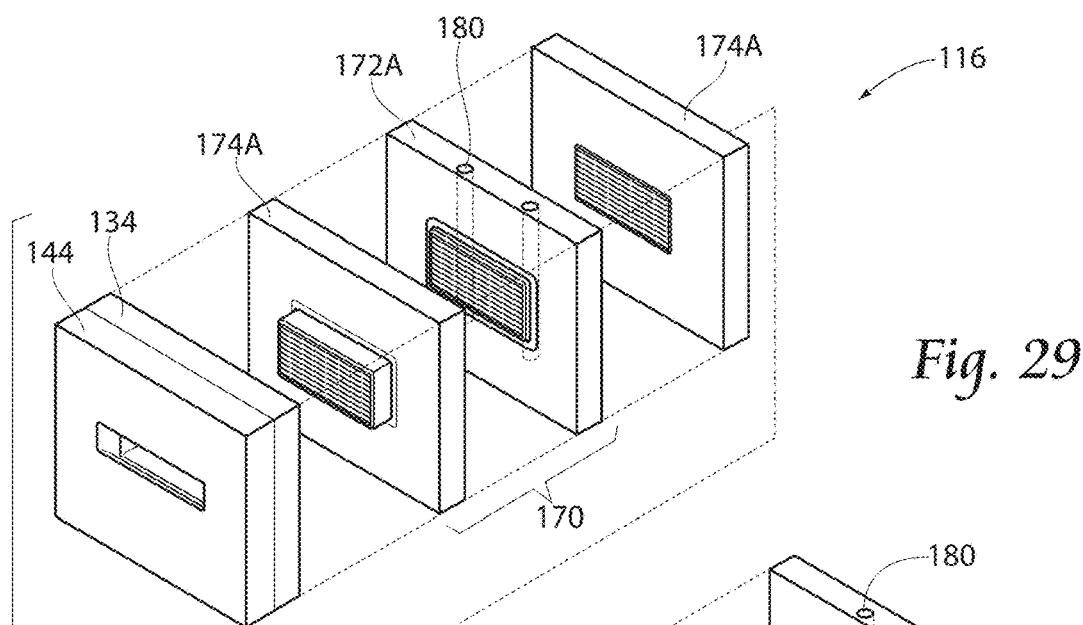
FIG. 29 is an exploded view of the flow distribution assembly illustrated in FIGS. 22, 23, 28.
Figure 29:
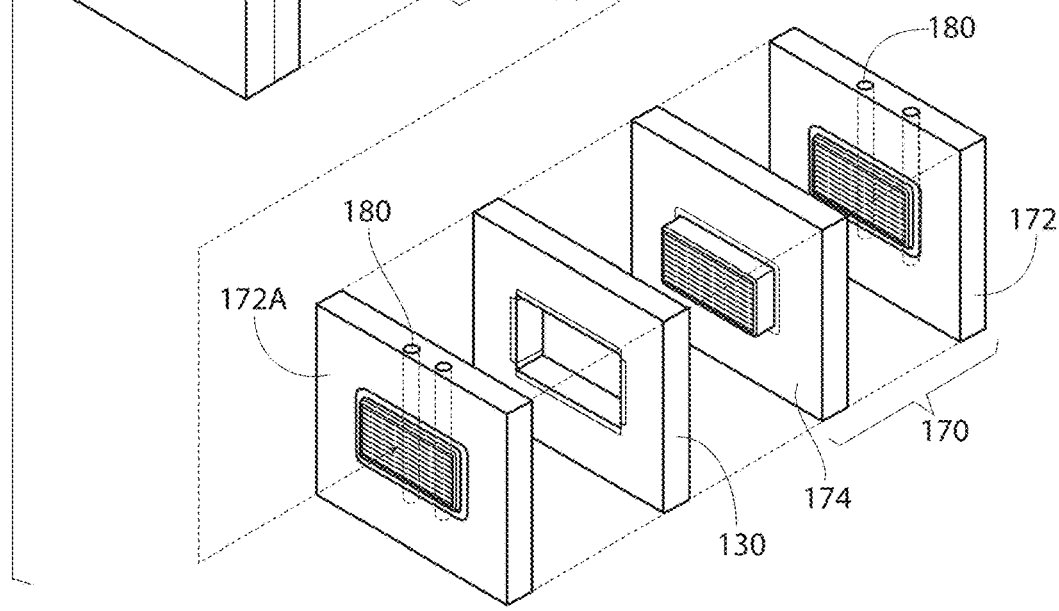
Figure 30:
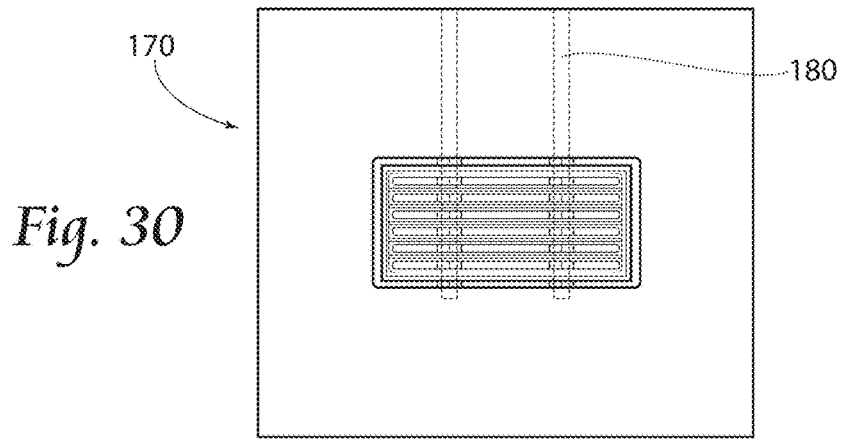
FIG. 30 is a front view of a line block assembly shown in FIGS. 28, 29.
Figure 31:
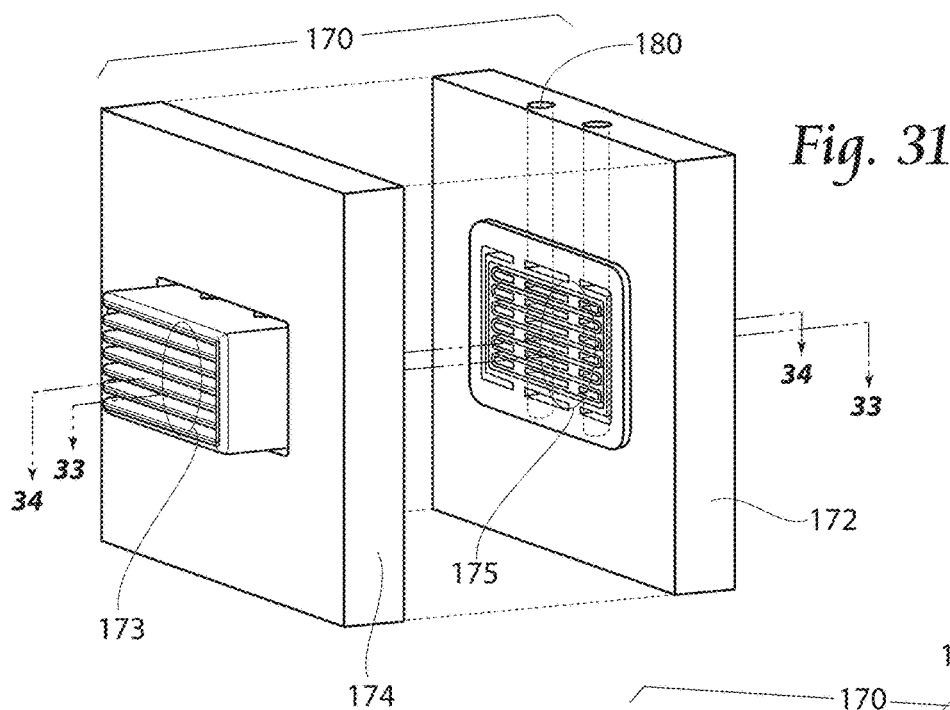
FIG. 31 is a front exploded view of the line block assembly illustrated in FIG. 30, and showing a line block entrance and a line block exit.
Figure 32:
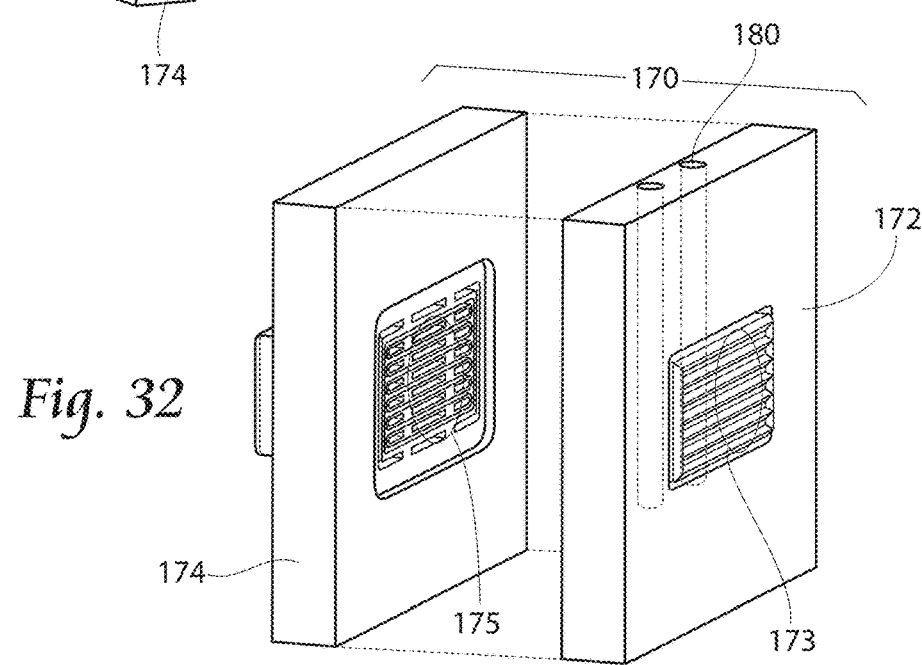
FIG. 32 is a rear exploded view of the line block assembly illustrated in FIGS. 30, 31.
Figure 33:
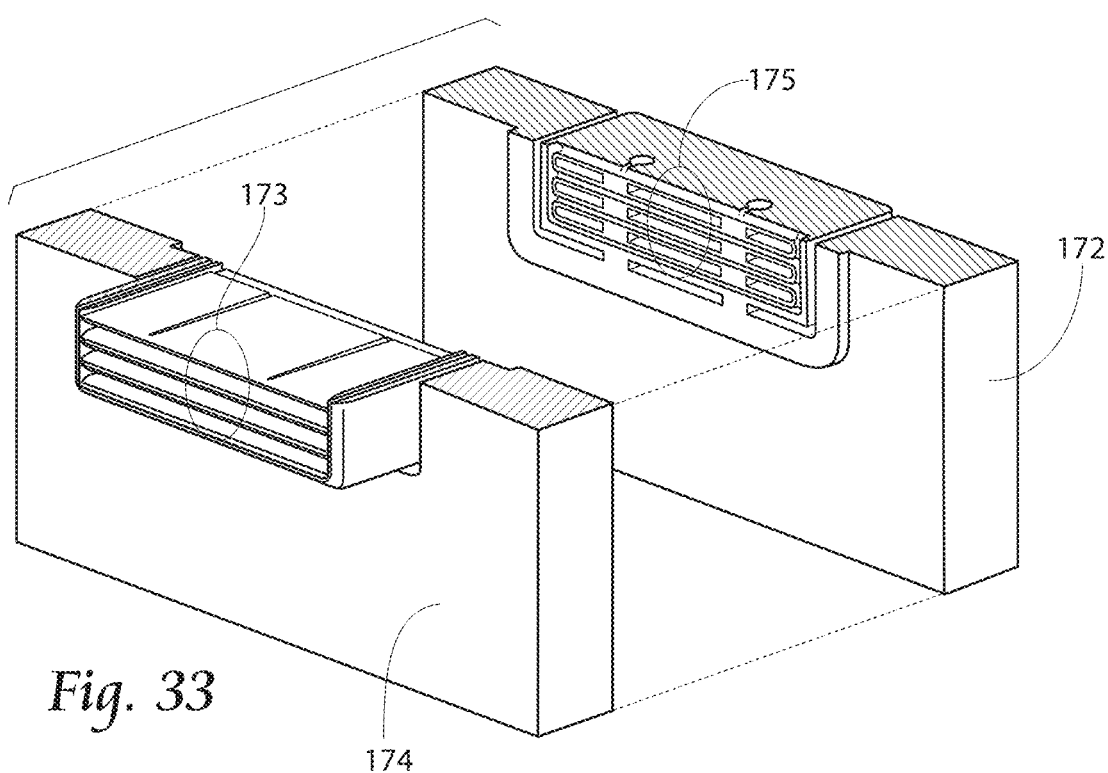
FIG. 33 is a section view of the line block assembly illustrated in FIG. 31, and taken along lines 33-33 thereof.
Figure 34:
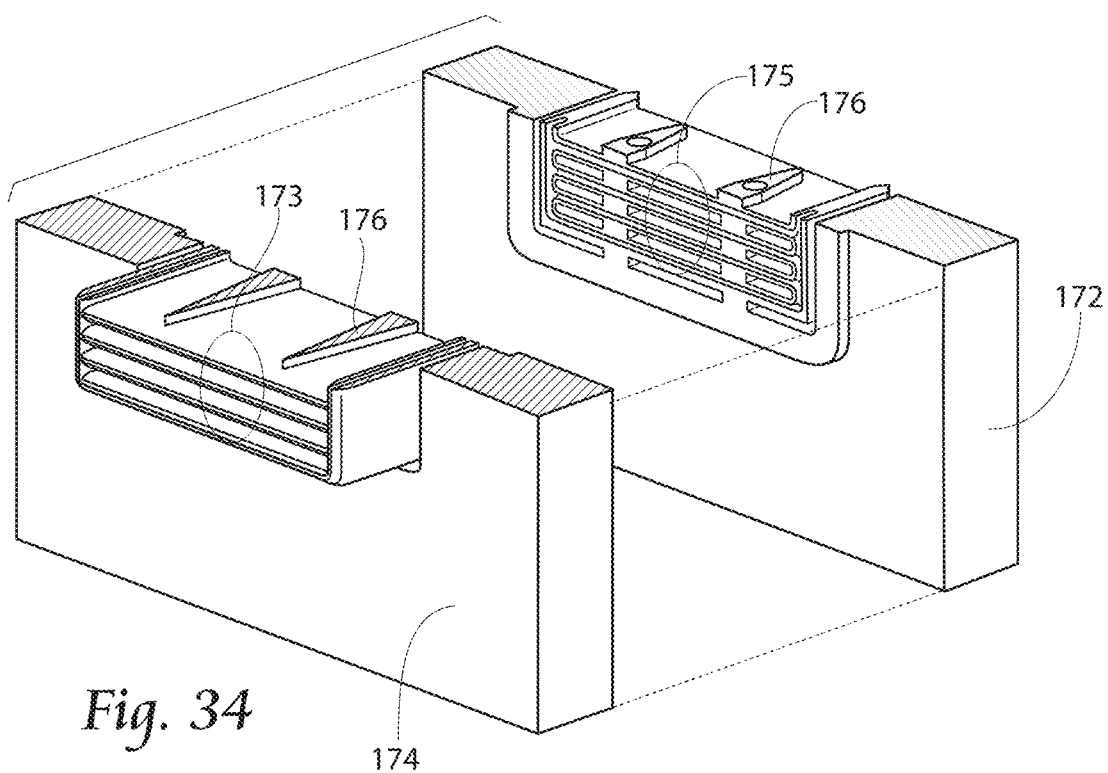
FIG. 34 is a section view of the line block assembly illustrated in FIG. 31, and taken along lines 34-34 thereof.
Figure 48:
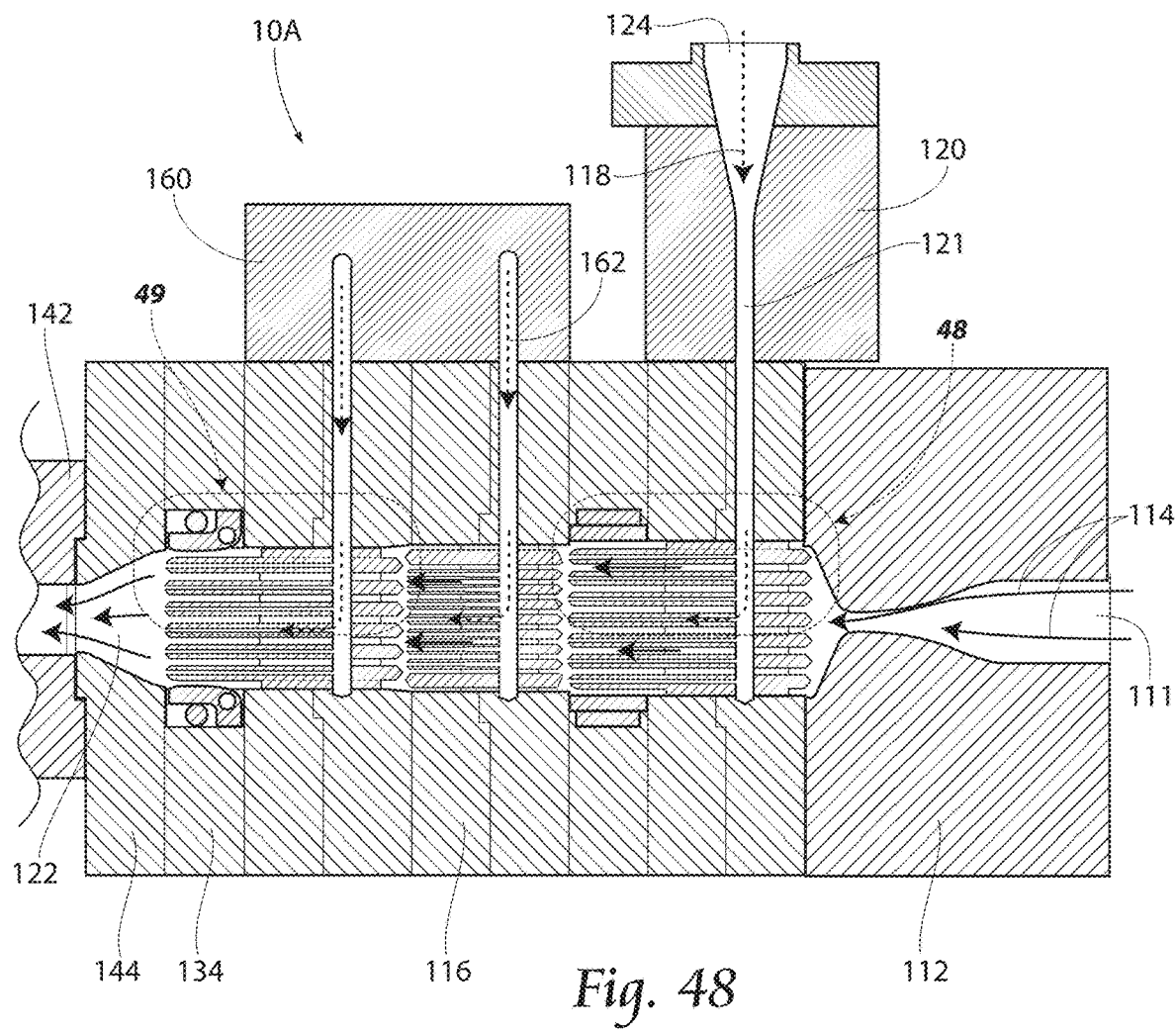
FIG. 48 is a sectional view of the flow distribution assembly, similar to that of FIG. 23, but showing flow of primary and secondary materials.
Figure 49:
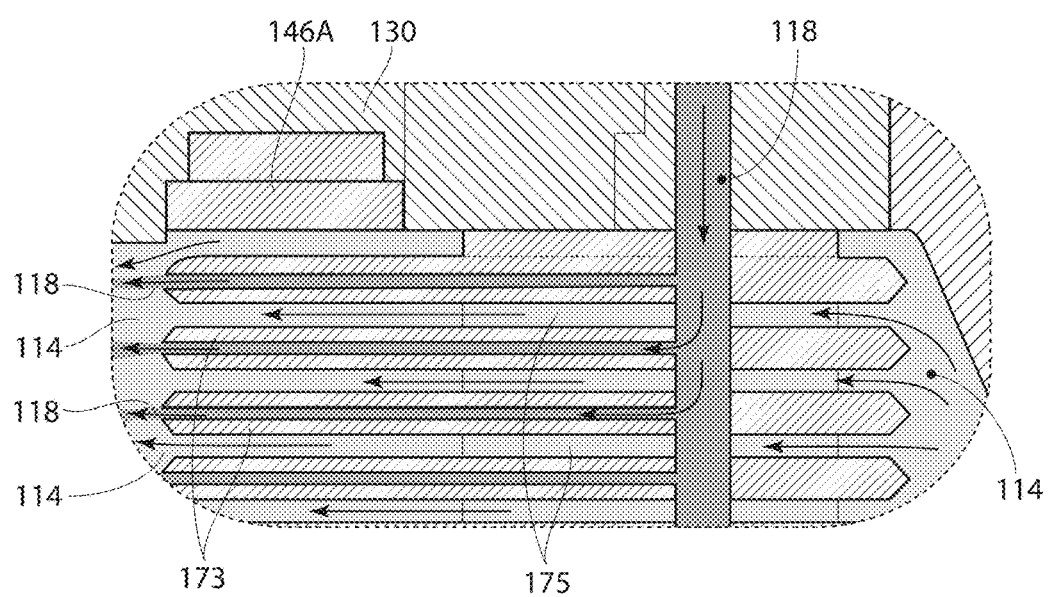
FIG. 49 is an enlarged view of the area noted as 49 in FIG. 48, and showing flow at primary and secondary inputs.
Figure 50:
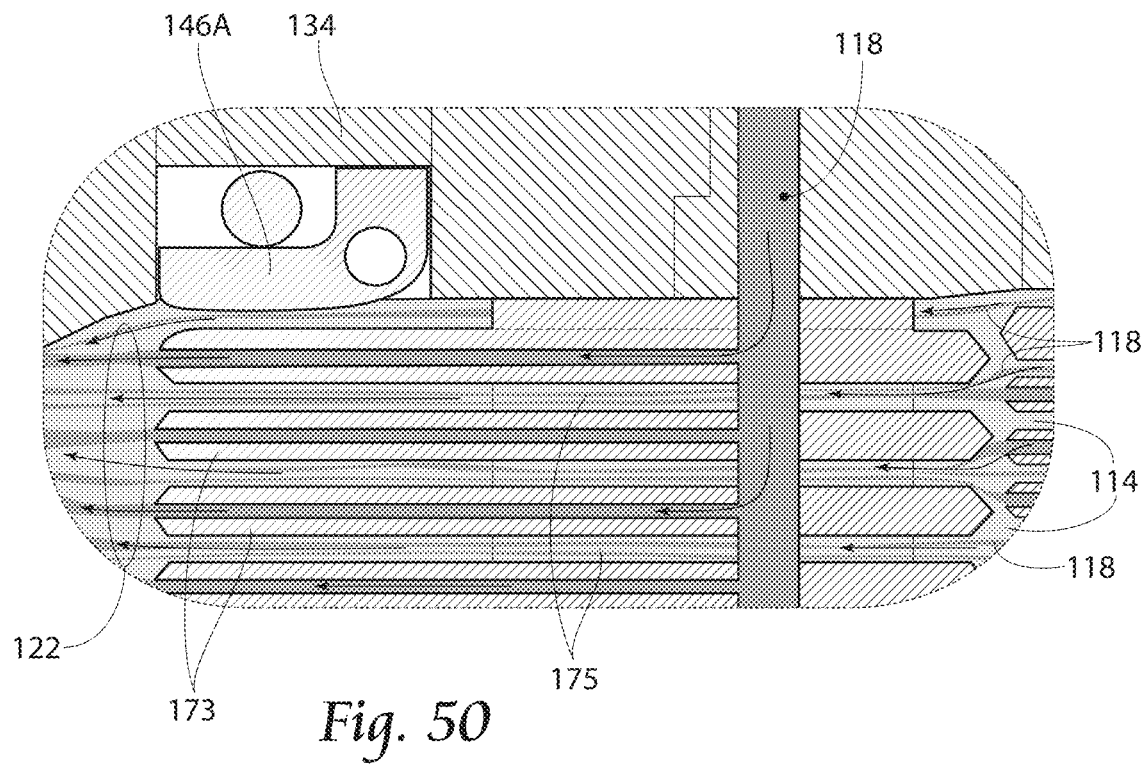
FIG. 50 is an enlarged view of the area noted as 50 in FIG. 48, and showing flow at extra secondary inputs.
Figure 51:
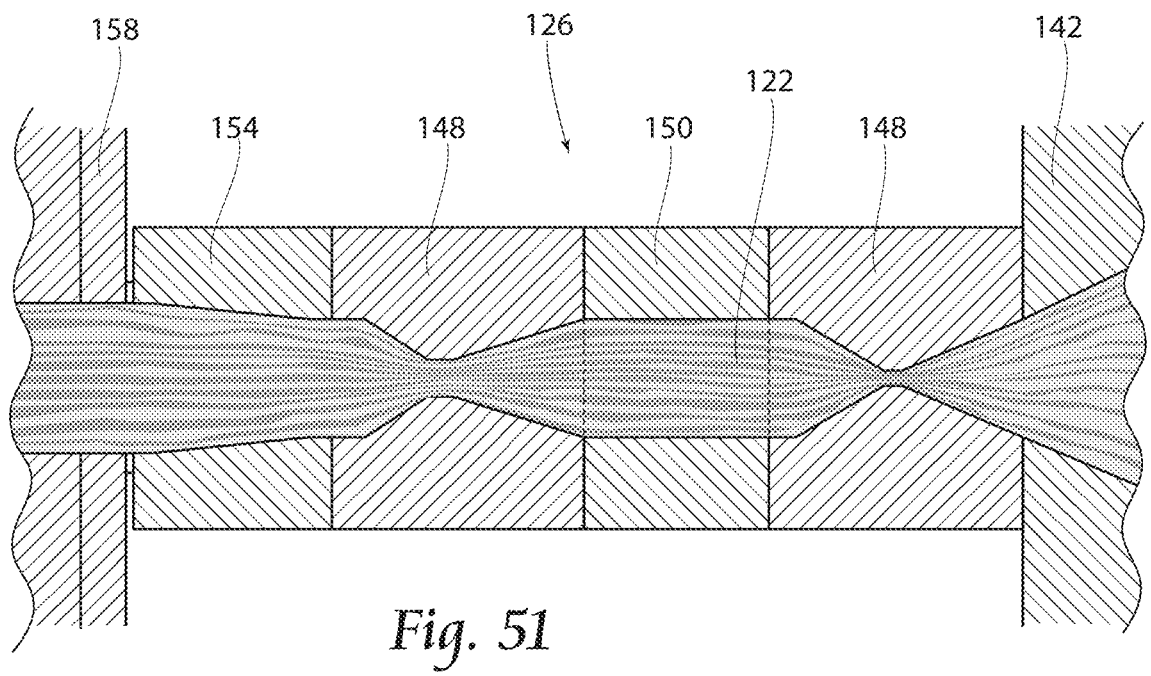
FIG. 51 is a view, similar to that of FIG. 45, but showing flow at compression/decompression zones.

A line block assembly 170 is illustrated particularly in FIGS. 30-34. As shown, each line block entrance 172 and line block exit 174 within the flow distribution assembly 116 align to provide stacked layers of fins 173 and linking channels 175 for carrying the melt stream 122 through the flow distribution assembly 116. As such, the finned array of channels 175 is arranged to divert the melt streams 114, 118, 162 as they enter the flow distribution assembly 116 through the respective inputs 11, 124, 164. Moreover, and as viewed in FIGS. 33, 34, the channels 175 may include an upstanding structure 176 to provide disruption and mixing to the melt stream 122. As is further illustrated, the line block entrance 172 includes at least one input bore 130 for alignment with a respective output 121, 166. For example, the input bore 180 of the line block assembly 170 of these views (see also FIG. 29) is arranged for alignment and communication with the secondary output 121. As seen, the secondary material exits 118 the secondary output 121, enters the line block entrance 172, is split, and each melt stream is diverted in the line block assembly 170 to cover the entire cross section equal to that of the primary material melt stream 113 in the line block assembly 170. As is further shown, the stacked fine 173 form flow channels 175. The primary material 114 flows from the primary input 111 through the flow channels 175, while the secondary material 118 flows from the secondary output 121 through the flow channels 175. Flow channel 175 depths are used to control the line block assembly 170 thicknesses. More specifically the appearance of color blending on the final profile 28 surface is critically controlled in the flow distribution assembly 116. As is seen in FIGS. 23, 29, and 48, the extra line block assemblies 170A further include input bores 180 which are arranged for alignment and communication with the extra line output 166.

The primary melt stream 114 enters the primary input manifold 112 (see FIGS. 24-27), and is split into multiple melt streams after it exits the primary input manifold assembly 112 at primary output 113 and enters the finned line block entrance 172 within the flow distribution assembly 116. Likewise, the secondary material melt stream 118 is also split into multiple melt streams after it exits the secondary input manifold assembly 120 at the secondary output 121 and enters the line block entrance 172 at input bore 180. A further, extra line manifold assembly 160 (see FIGS. 37, 38), includes an extra line block entrance 172A for feed of a third melt stream 162 into the flow distribution assembly 116. Even distribution of material in the melt streams 114, 118, 162 is an imperative aspect of the process, to fill the entirety of each line block assembly 170. As discussed above, the importance of this step is significant and contrasts with prior art methods in which multi-manifold feedblocks are used, and the material is added in a single inlet port in those processes the material continues as a single melt stream. In contrast, the method of the present invention ultimately splits the primary and accent material melt streams to thereby create variegation of the finished extruded profile 28.

Figure 36:
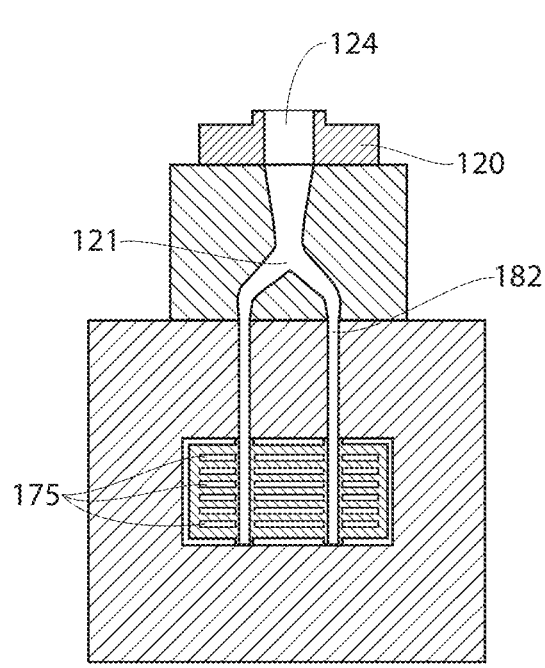
FIG. 36 is a section view of the secondary color input manifold and line assembly illustrated in FIG. 22, and taken along lines 36-36 thereof.
Figure 35:
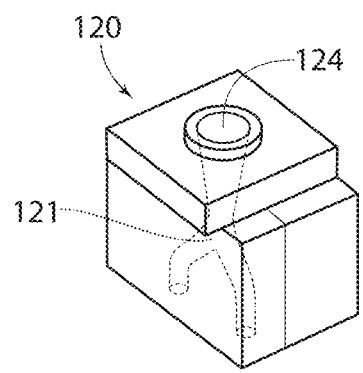
FIG. 35 is a perspective view of the secondary color input manifold illustrated in FIG. 22.
Figure 37:
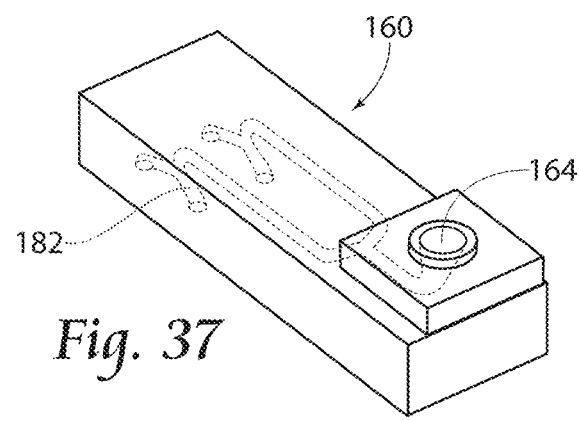
FIG. 37 is a perspective view of the extra line manifold illustrated in FIG. 22.
Figure 38:
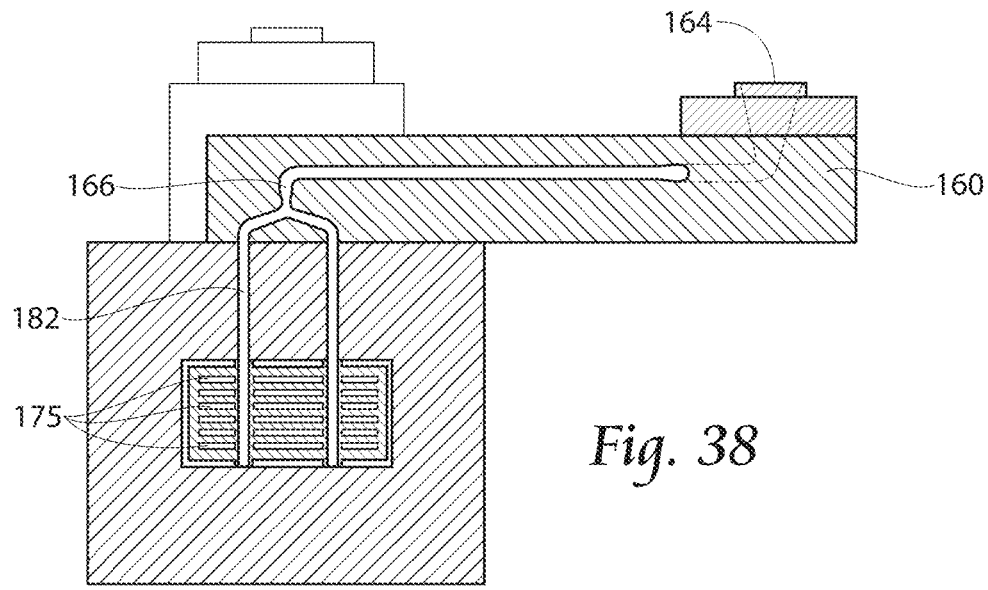
FIG. 38 is a section view of the extra line manifold and line assembly illustrated in FIG. 22, and taken along lines 38-38 thereof.

With attention to FIGS. 36-38, the secondary input manifold assembly 120 and line block assembly 170, and extra line manifold assembly 160 with line block assembly 170 may be seen. As previously mentioned, the secondary input manifold 120 includes a secondary input 124 and exits at secondary output 121. The secondary output 121 is arranged for communication with a line block assembly entrance 172, where the secondary material 118 is evenly distributed in the flow distribution assembly 116. An extra line input manifold assembly 160, for entry of a third melt stream 162, includes an extra line input 164 and exits at extra line output 166. The extra line output 166 is arranged for communication with an extra line block assembly entrance 172A, where the extra color stream 162 is evenly distributed in the flow distribution assembly 116. As viewed, both the secondary input manifold assembly 120 and the extra line manifold assembly 160 may include a bifurcated delivery channel 182 to further distribute the unit streams 118, 162 in the respective line block assembly 170.

Figure 39:
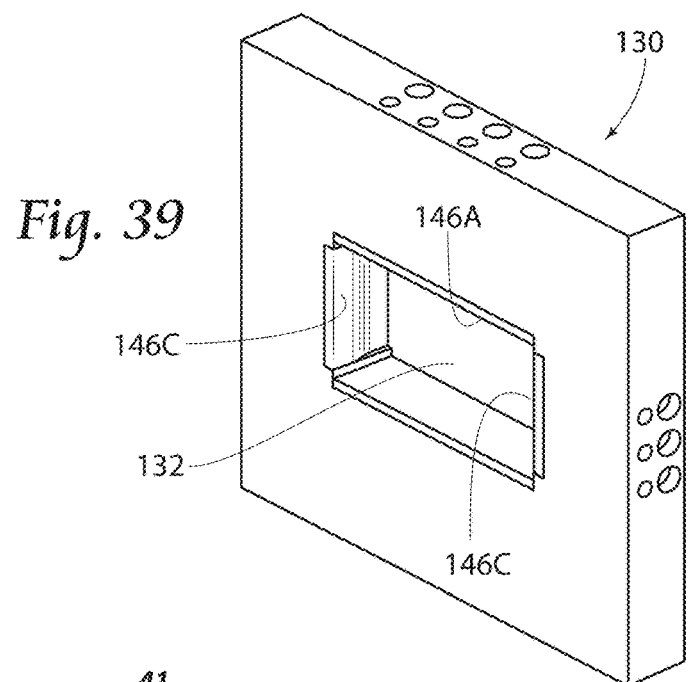
FIG. 39 is a perspective view of the surface control block illustrated in FIGS. 22, 23, 29.

As may be seen in FIGS. 23, 29, 39, the flow distribution assembly 116 may include a surface control block 130, surface adjustment block 134, and transition plate 144, as will be discussed. A surface control block 130 may be positioned between a line block exit 174 and an adjacent line block entrance 172 when multiple line block assemblies 170 are used. As shown, the flow distribution assembly 116 for use with the present assembly 10A includes a plurality of line block assemblies 170 and including extra line block entrance 172A, an extra line block exit 174A. The flow distribution assembly 116 further includes a surface adjustment block 134, and a transition plate 144 (see FIGS. 28, 29, 40). The surface control block 130 may be seen particularly in FIG. 39 and includes an aperture 132 through which the melt stream 122 flows, and line control upper fin 146A, a line control lower fin 146B, and line control side fins 146C. The fins 146A, 146B, 146C of the surface control block 130 deliver a smooth melded appearance to the melt stream 122 as it passes through the surface control block aperture 132.

Figure 40:
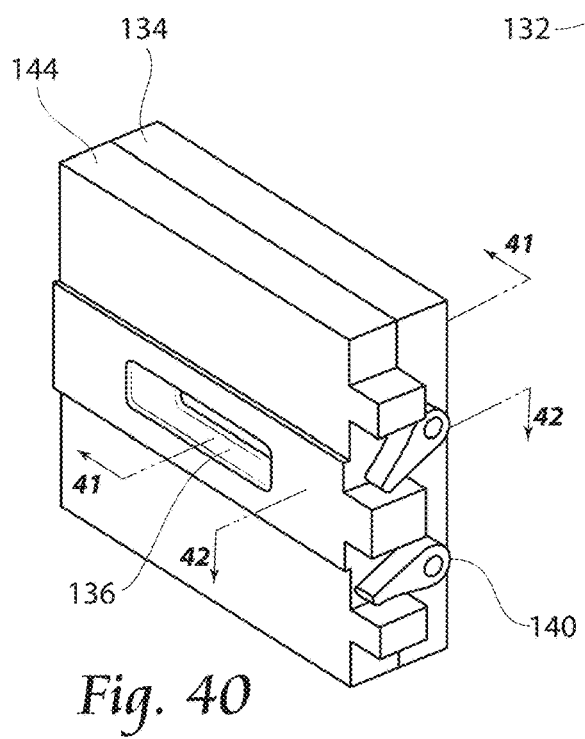
FIG. 40 is a perspective view of the surface adjustment block and transition plate illustrated in FIGS. 22, 23, 29.
Figure 41:
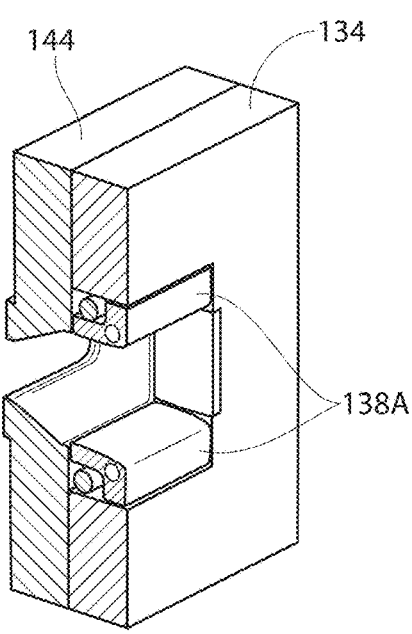
FIG. 41 is a section view of the surface adjustment block and transition plate illustrated in FIG. 40, and taken along lines 41-41 thereof.
Figure 42:
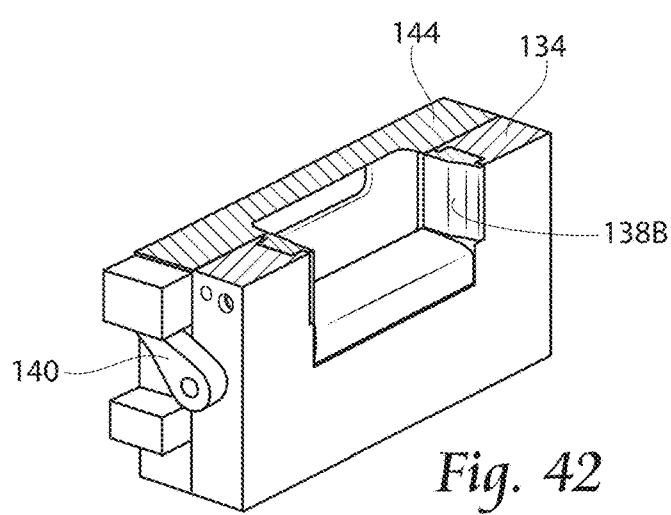
FIG. 42 is a section view of the surface adjustment block and transition plate illustrated in FIG. 40, and taken along lines 42-42 thereof.
Figure 43:
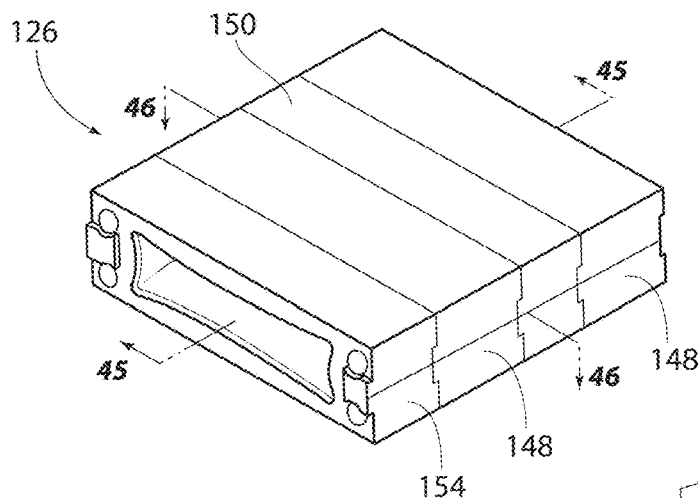
FIG. 43 is a perspective view of the compression/decompression assembly illustrated in FIGS. 22, 23.
Figure 44:
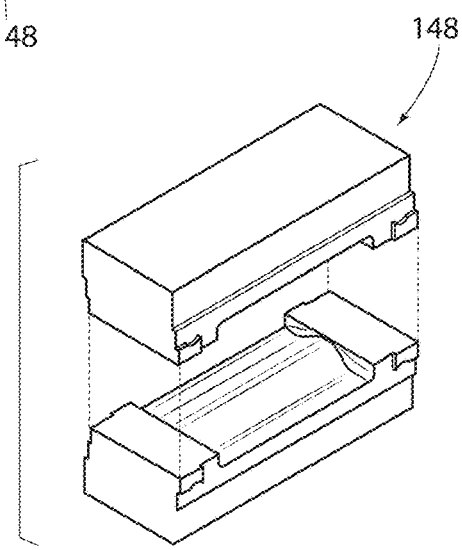
FIG. 44 is an exploded view of the assembly illustrated in FIG. 43.
Figure 45:
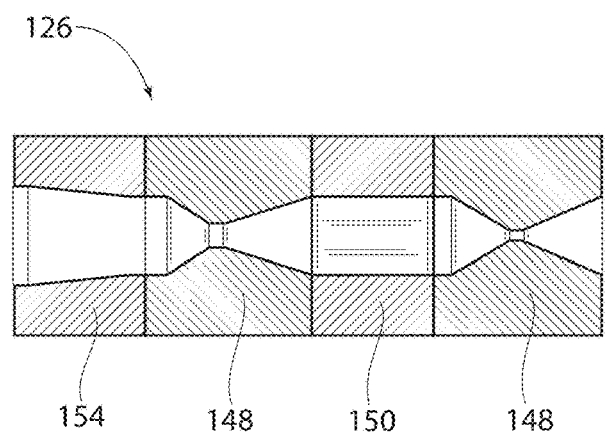
FIG. 45 is a section view of the assembly illustrated in FIG. 43, and taken along lines 45-45 thereof.
Figure 46:
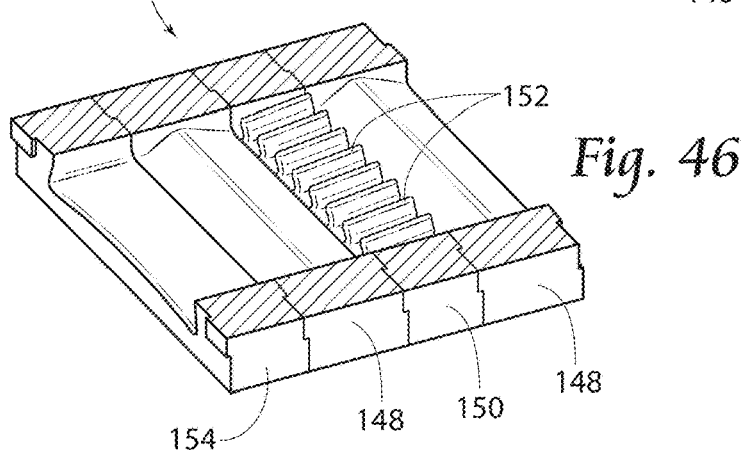
FIG. 46 is a section view of the assembly illustrated in FIG. 43, and taken along lines 46-46 thereof.

FIGS. 40-42 illustrate a surface adjustment block 134 and transition plate 144 for use in the flow distribution assembly 116. As seen, the surface adjustment block 134 includes an adjustment block aperture 136, through which the melt stream 122 flows, upper and lower surface adjustment fins 138A, side adjustment fins 138B, and adjustment levers 140.

Similar to the surface control block 130, the adjustment fins 138A, 138B of the surface adjustment block 134 deliver a smooth melded appearance to the melt stream 122 as it passes through the surface adjustment block 134 and to the transition plate 144.

The surface control block 130, surface adjustment block 134, alone with at least one line control fin 146A, 146B, 146C, and in combination with an effective amount of chemical blow agent (up to 3% by weight), delivers a smooth melded appearance to the profile 28 surface as the multiple melt streams unite. As illustrated particularly in FIG. 48 the series of melt streams exit evenly from the flow distribution assembly 116, flow through the surface adjustment block 134, and unite in the transition plate 144 into the compression/decompression zone assembly 126 (see also FIGS. 23, 50). As seen particularly in FIGS. 43-46, and similar to the previous embodiment, the compression/decompression zone assembly 126 preferably includes a series of zones, including restrictors 148 and mixers 150, wherein the mixers 150 may include upstanding ridges 152 or other interrupters to provide turbulence and blending of the mixture 122 and to supply profile 28 surface with striations and other desired characteristics. The various melt streams are combined and compressed together in the compression/decompression zone assembly 126 by use of temperature control and pressure control, in combination with the various other described areas of the process. As in the previous embodiment, it is preferred that the melt temperature be controlled between 300-400 degrees Fahrenheit across the assembly 10A. Moreover, it is preferred that pressure across the assembly 10A is to be controlled between 500-2000 psi. Use of the flow distribution assembly 116 in conjunction with the compression/decompression zone assembly 126 is critical to maintain stability of the material. Further, the degree of laminar flow as a semi-laminar flow look created by the present invention, imparts the end product (extruded variegated plastic profile 28) with a highly desired natural, wood-like appearance, which is critically impacted by the degree of temperature exposure, effective chemical blowing agent amount, and series of pressure turbulences. It is to be understood that similar to the previous embodiment, the blowing agent used with the assembly 10A and method may be any blowing agent known in the industry with an effective amount in the range of 0.5-4.0 percent used in the method. The unique combination of turbulence, created by compressing, decompressing, recompressing, temperature, pressure created by the chemical blowing agent and pressure drop across the multi manifold slotted feed block assembly 10A, all contribute to produce the desired swirling natural wood-like cross sectional appearance of the finished extruded variegated plastic profile 28. Furthermore, the preferred degree of pressure drop, less than 2000 psi, created as the material moves from the flow distribution assembly 116, through the transition plate 144, and connector 142 of the compression/decompression zone assembly 116, in combination with the effective amount of chemical blowing agent create a superior, uniform, fine cell structure in the finished profile 28.

With attention to FIG. 48, upon exiting the compression/decompression zone assembly 126, the blended stream extrudate 122 will expand. Upon exposure to the atmosphere, gas is exhausted from the chemical blowing agent and escapes the extrudate 122. The extrudate 122 continues to expand sufficiently to fill the calibrator 158 (see FIG. 51), where the combination of expansion, gas expulsion, and distance between the compression/decompression zone assembly 126 and calibrator 158 create a unique fine grain, matte, and tight furniture grade surface on the profile 28. As the variegated plastic profile 28 passes through the slow taper extrusion plate 154, the profile 28 is sized into its final molded shape prior to it entering the cooling tank 56. The profile 281' continues to cool by conventional means and a cutoff saw (not shown) cuts the profile to the desired lengths.

A method of manufacturing an extruded variegated plastic product according to the present invention includes the steps of: providing a multi-manifold slotted feed block assembly 10, 10A, the multi-manifold slotted feed block assembly 10, 10A including a primary input manifold assembly 12, 112 having a primary input 11, 111 and a primary output 13, 113, and a secondary input manifold assembly 120, providing the multi-manifold slotted feed block assembly 10, 10A with a flow distribution assembly 16, 116, the flow distribution assembly 16, 116 including a plurality of finned channels 40A, 40B, 175; providing a primary melt stream 14, 114; introducing a predetermined amount of said primary melt stream 14, 114 into said primary input manifold assembly 12, 112 at said primary input 11, 111; moving t e primary stream 14, 114 through the primary input manifold assembly 12, 112 and into the flow distribution assembly 16, 116; distributing the primary melt stream 14, 114 though the plurality of finned channels 40A, 40B, 175; providing a secondary melt stream 18, 118; introducing a predetermined amount of the secondary melt stream 18, 118 into the secondary input manifold assembly 120; moving the secondary melt stream 18, 118 through the secondary input manifold assembly 120 and into the flow distribution assembly 16, 116; distributing the secondary melt stream 18, 118 though the plurality of finned channels 40A, 40B, 175; combining the primary melt stream 14, 114 and the secondary melt stream 18, 118 in the flow distribution assembly 16, 116; moving the primary and secondary melt streams 14, 114, 18, 118 out of the flow distribution assembly 16, 116 in a blended melt stream 22, 122; providing zone assembly 26, 126 having at least one restrictor 48, 148 and at least one mixer 50, 150; moving the blended melt stream 22, 122 into the zone assembly 26, 126; and moving the blended melt stream 22, 122 out of the zone assembly 26, 126 and through a cooling tank 56. The method may include the further steps of providing an extra line manifold assembly 160; providing a third melt stream 162; introducing a predetermined amount of the third melt stream 162 into the extra line manifold assembly 160; moving the third melt stream 162 through the extra line manifold assembly 160 and into the flow distribution assembly 116; distributing the third melt stream 162 though the plurality of finned channels 175; and blending the third melt stream 162 with the primary melt stream 14, 114 and the secondary melt stream 18, 118 in the flow distribution assembly 16, 116.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A method for manufacturing an extruded variegated plastic product including the steps of:
    providing a multi-manifold slotted feed block assembly, said multi-manifold slotted feed block assembly including a primary input manifold assembly having a primary input and a primary output, and a secondary input manifold assembly;

providing said multi-manifold slotted feed block assembly with a flow distribution assembly, said flow distribution assembly including a plurality of finned channels;
providing a primary melt stream;
introducing a predetermined amount of said primary melt stream into said primary input manifold assembly at said primary input;
moving said primary melt stream through said primary input manifold assembly and into said flow distribution assembly;
distributing said primary melt stream though said plurality of finned channels;
providing a secondary inch stream;
introducing a predetermined amount of said secondary melt stream into said secondary input manifold assembly;
moving said secondary melt stream through said secondary input manifold assembly and into said flow distribution assembly;
distributing said secondary melt stream though said plurality of finned channels;
combining said primary melt stream and said secondary melt stream in said flow distribution assembly;
moving said primary melt stream and secondary melt stream out of said flow distribution assembly in a blended melt stream;
providing at least one surface control block, said at least one surface control block including at least one adjustment fin;
moving said blended melt stream through said at least one surface control block;
providing a zone assembly having at least One restrictor and at least one mixer;
moving said blended melt stream into said zone assembly; and
moving said blended melt stream out of said zone assembly and through a cooling tank.

2. The method of claim 1 including the further steps of;
providing an extra line manifold assembly;
providing a third melt stream;
introducing a predeterminined amount of said third melt stream into said extra line manifold assembly;
moving said third melt stream through said extra line manifold assembly and into said flow distribution assembly;
distributing said third melt stream though said plurality of finned channels; and
blending said third melt stream with said primary melt stream and said secondary melt stream in said flow distribution assembly.

* * * * *

UNITED STATES PATENT AND TRADEMARK OFFICE
CERTIFICATE OF CORRECTION

PATENT NO. : 11,396,121 B2
APPLICATION NO. : 16/545910
DATED : July 26, 2022
INVENTOR(S) : Ledvina et al.

Page 1 of 1

It is certified that error appears in the above-identified patent and that said Letters Patent is hereby corrected as shown below:

In the Claims

Claim 1, Column 11, Line 14: "secondary inch stream" should read --- secondary melt stream ---

Signed and Sealed this
Sixteenth Day of September, 2025

Coke Morgan Stewart
*Acting Director of the United States Patent and Trademark Office*